US012657800B2

(12) United States Patent
Yang et al.

(10) Patent No.: US 12,657,800 B2
(45) Date of Patent: Jun. 16, 2026

(54) SYSTEMS AND METHODS FOR IMAGING

(71) Applicant: SHANGHAI UNITED IMAGING HEALTHCARE CO., LTD., Shanghai (CN)

(72) Inventors: Meili Yang, Shanghai (CN); Yanfeng Du, Shanghai (CN); Jianwei Fu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 424 days.

(21) Appl. No.: 18/488,002

(22) Filed: Oct. 16, 2023

(65) Prior Publication Data

US 2024/0046534 A1 Feb. 8, 2024

Related U.S. Application Data

(63) Continuation of application No. PCT/CN2022/087499, filed on Apr. 18, 2022.

(30) Foreign Application Priority Data

Apr. 16, 2021 (CN) .......................... 202110412250.6
Apr. 16, 2021 (CN) .......................... 202110414061.2

(51) Int. Cl.
G06T 11/00 (2006.01)
(52) U.S. Cl.
CPC ....... G06T 11/006 (2013.01); G06T 2211/408 (2013.01); G06T 2211/441 (2023.08); G06T 2211/444 (2023.08)
(58) Field of Classification Search
CPC ............. G06T 11/006; G06T 2211/444; G06T 2211/441; G06T 2211/408
See application file for complete search history.

(56) References Cited

U.S. PATENT DOCUMENTS 6,987,833 B2 * 1/2006 Du .......................... A61B 6/482
378/53
8,705,822 B2 * 4/2014 Yu .......................... G06T 11/006
382/128
(Continued)

FOREIGN PATENT DOCUMENTS

CN 103559699 A 2/2014
CN 104759037 A 7/2015
(Continued)

OTHER PUBLICATIONS

Zhao et al., 2020, "Obtaining dual-energy computed tomography (CT) information from a single-energy CT image for quantitative imaging analysis of living subjects by using deep learning" (pp. 1-13) (Year: 2020).*

(Continued)

*Primary Examiner* — Manav Seth
(74) *Attorney, Agent, or Firm* — METIS IP LLC

(57) ABSTRACT

The present disclosure relates to systems and methods for imaging. The method may include obtaining a first image and topology data of an object, wherein the topology data may include first topology data and second topology data, and the first topology data may correspond to the second topology data. The method may also include determining a base material density image corresponding to the first image, determining a difference in the topology data based on the first topology data and the second topology data, and determining a second image corresponding to the first image based on the first image, the base material density image, and the difference in the topology data.

20 Claims, 11 Drawing Sheets

100

(56) References Cited

U.S. PATENT DOCUMENTS

| | | | | |
|---|---|---|---|---|
| 8,923,583 B2 * | 12/2014 | Thibault | ............... | G06T 11/006 |
| | | | | 382/128 |
| 9,585,626 B2 * | 3/2017 | Gao | ...................... | G06T 11/006 |
| 2004/0101104 A1 | 5/2004 | Avinash et al. | | |
| 2005/0259781 A1 | 11/2005 | Ying et al. | | |
| 2007/0041497 A1 | 2/2007 | Schnarr et al. | | |
| 2010/0128948 A1 | 5/2010 | Thomsen et al. | | |
| 2014/0369458 A1 * | 12/2014 | Shen | ...................... | A61B 6/032 |
| | | | | 378/5 |
| 2020/0000425 A1 | 1/2020 | Ji et al. | | |

FOREIGN PATENT DOCUMENTS

| | | | |
|---|---|---|---|
| CN | 108010098 A | 5/2018 | |
| CN | 108010099 A | 5/2018 | |
| CN | 108230277 A | 6/2018 | |
| CN | 110084864 A | 8/2019 | |
| CN | 110189389 A | 8/2019 | |
| CN | 110390700 A | 10/2019 | |
| CN | 111161367 A | 5/2020 | |
| CN | 111340127 A | 6/2020 | |
| EP | 1643447 A1 * | 4/2006 | ........... G06T 11/005 |
| GB | 2521409 A * | 6/2015 | ........... A61B 6/4014 |

OTHER PUBLICATIONS

International Search Report in PCT/CN2022/087499 mailed on Jul. 12, 2022, 5 pages.

Written Opinion in PCT/CN2022/087499 mailed on Jul. 12, 2022, 4 pages.

Lyu, Tianling et al., Estimating Dual-energy CT Imaging from Single-energy CT Data with Material Decomposition Convolutional Neural Network, Medical Image Analysis, 2021, 12 pages.

First Office Action in Chinese Application No. 202110414061.2 mailed on Jul. 25, 2025, 21 pages.

Du, Kangning et al., Medium Resolution SAR Image Time-series Built-up Area Extraction Based on Multilayer Neural Network, Journal of Radars, 5(4): 410-418, 2016.

* cited by examiner

<u>200</u>

<u>300</u>

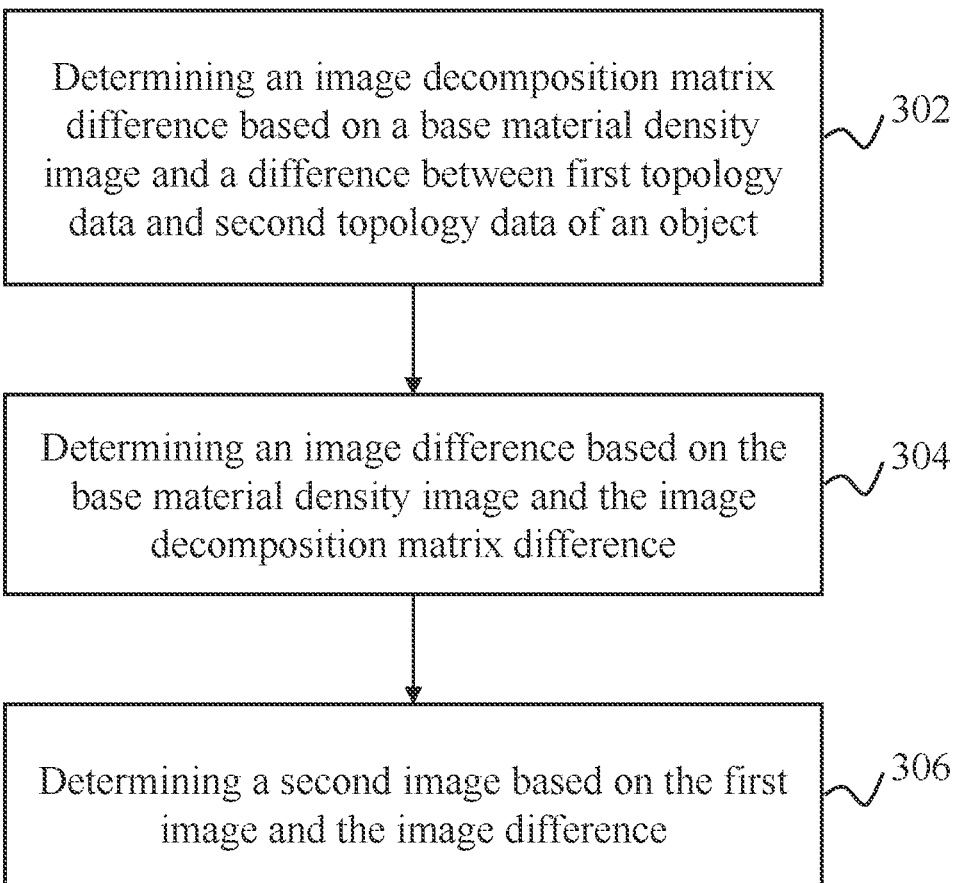

Determining an image decomposition matrix difference based on a base material density image and a difference between first topology data and second topology data of an object ~/302

Determining an image difference based on the base material density image and the image decomposition matrix difference ~/304

Determining a second image based on the first image and the image difference ~/306

FIG. 3

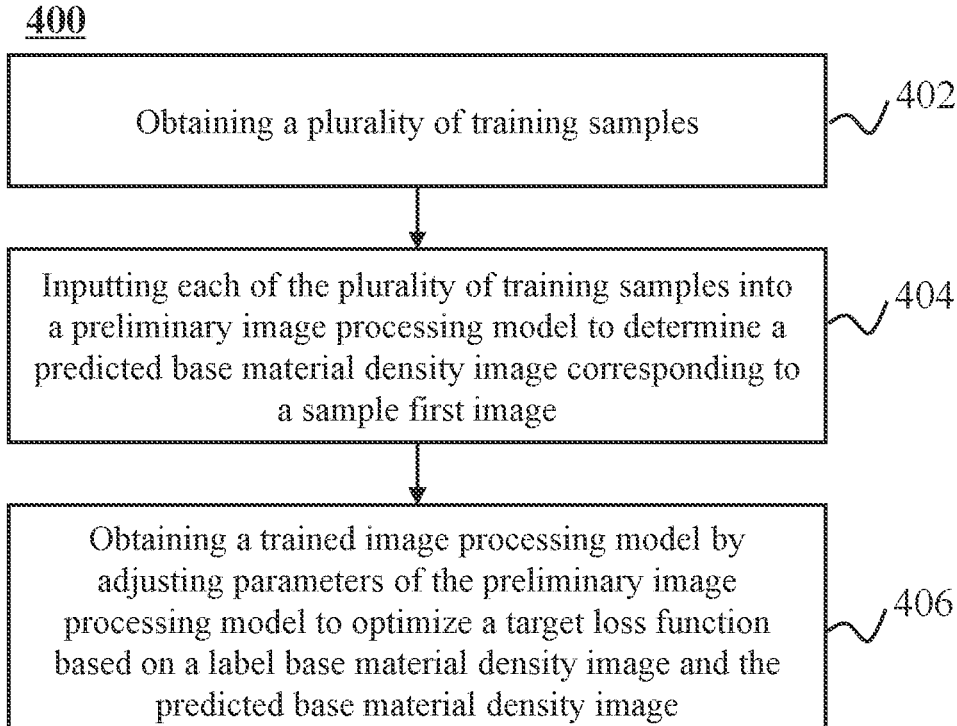

400

Obtaining a plurality of training samples ~402

Inputting each of the plurality of training samples into a preliminary image processing model to determine a predicted base material density image corresponding to a sample first image ~404

Obtaining a trained image processing model by adjusting parameters of the preliminary image processing model to optimize a target loss function based on a label base material density image and the predicted base material density image ~406

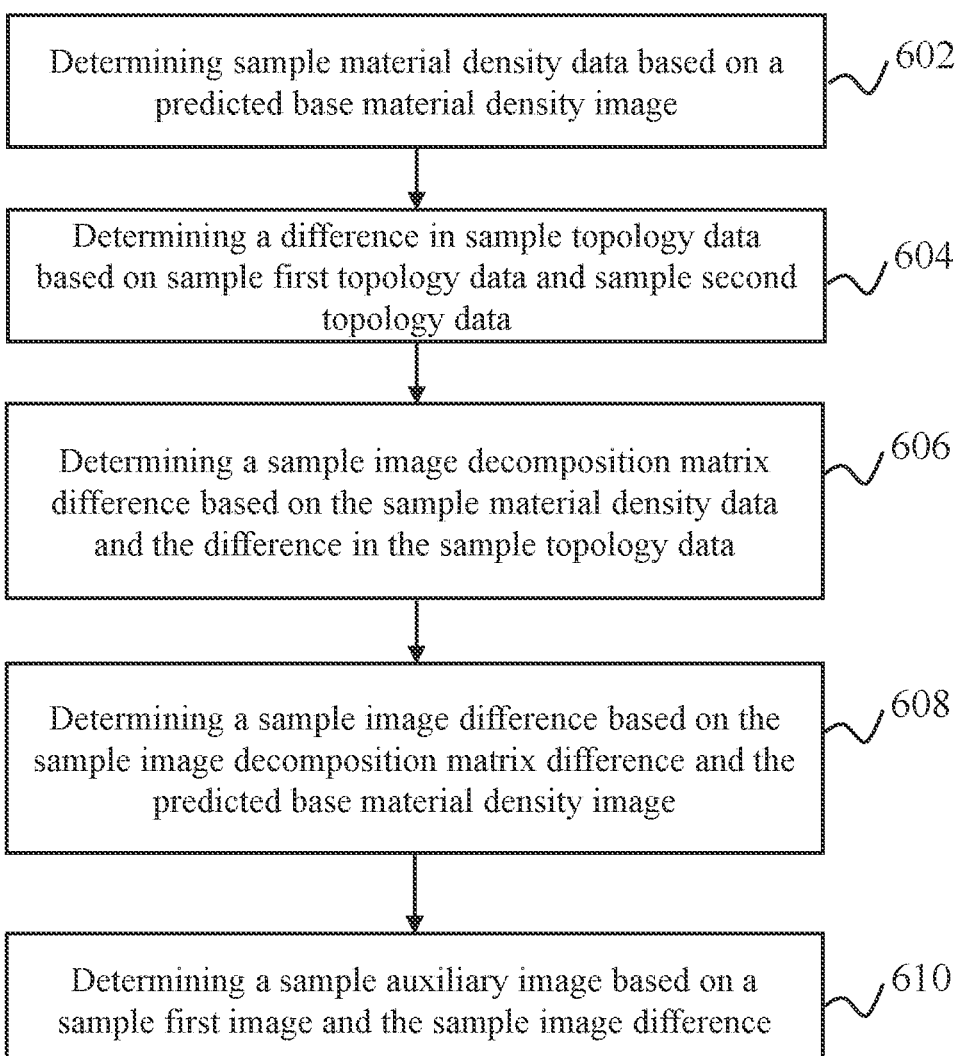

Determining sample material density data based on a predicted base material density image ～ 602

Determining a difference in sample topology data based on sample first topology data and sample second topology data ～ 604

Determining a sample image decomposition matrix difference based on the sample material density data and the difference in the sample topology data ～ 606

Determining a sample image difference based on the sample image decomposition matrix difference and the predicted base material density image ～ 608

Determining a sample auxiliary image based on a sample first image and the sample image difference ～ 610

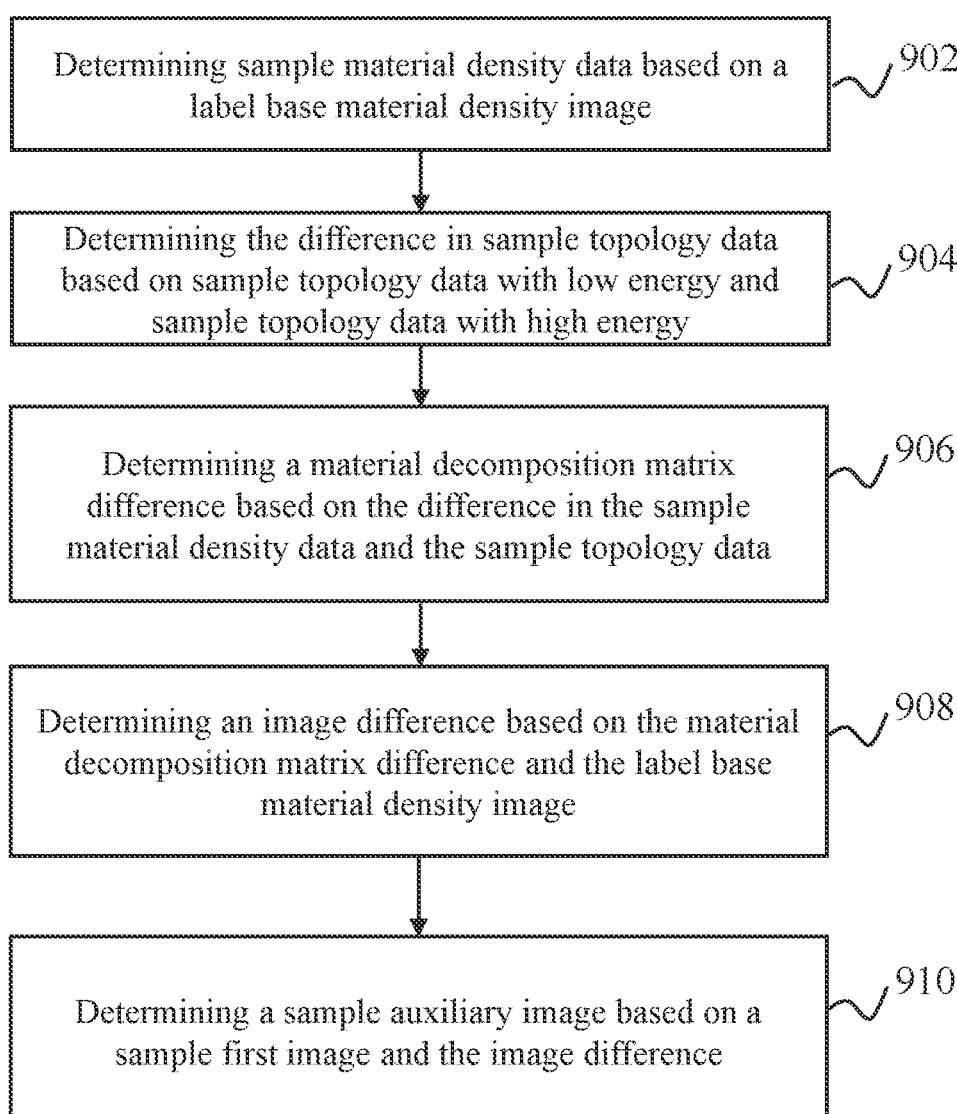

Determining sample material density data based on a label base material density image ～/902

Determining the difference in sample topology data based on sample topology data with low energy and sample topology data with high energy ～/904

Determining a material decomposition matrix difference based on the difference in the sample material density data and the sample topology data ～/906

Determining an image difference based on the material decomposition matrix difference and the label base material density image ～/908

Determining a sample auxiliary image based on a sample first image and the image difference ～/910

Figure 10:
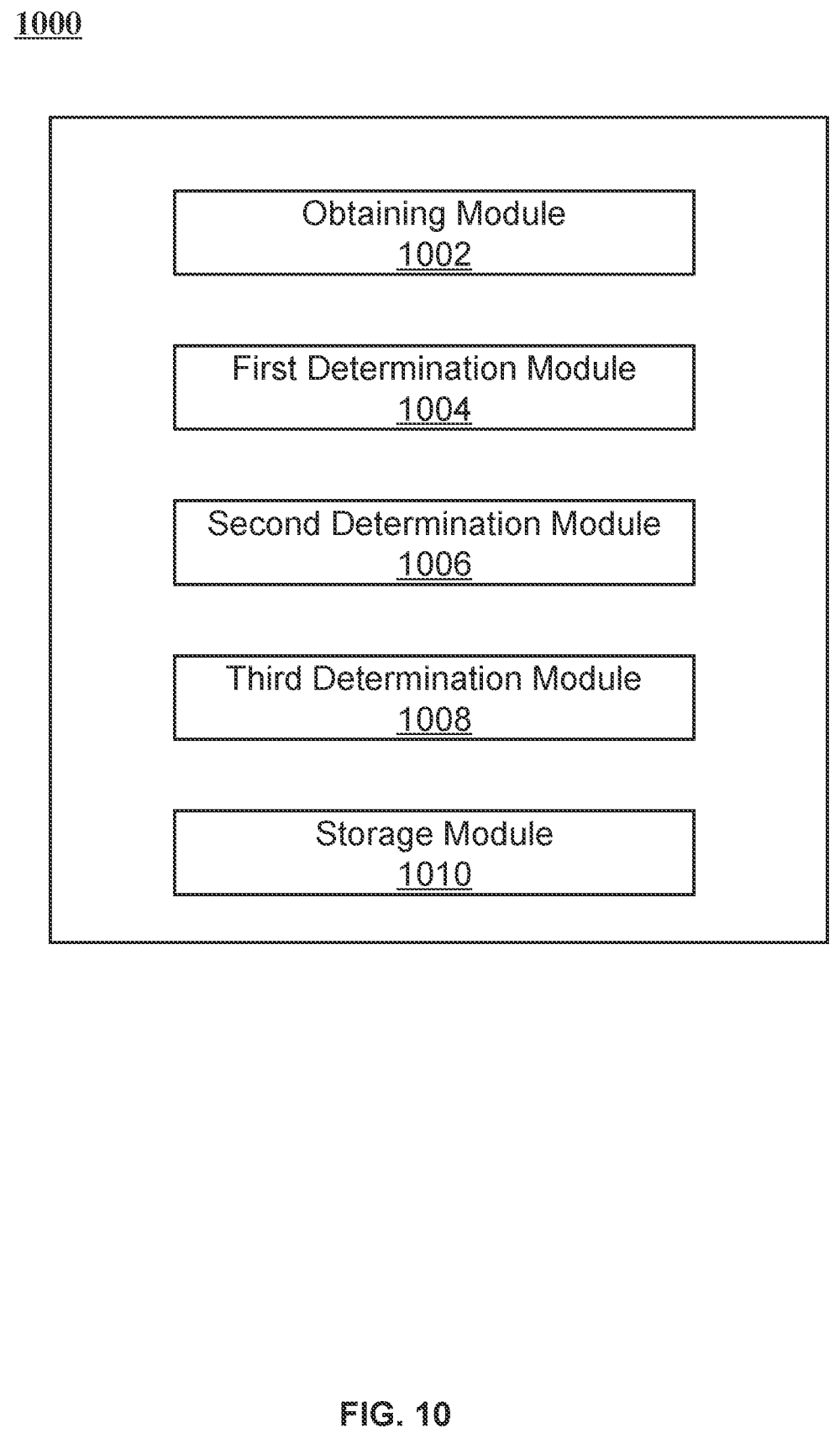

Obtaining Module
1002

First Determination Module
1004

Second Determination Module
1006

Third Determination Module
1008

Storage Module
1010

Obtaining Module
1102

Training Module
1104

Storage Module
1106

SYSTEMS AND METHODS FOR IMAGING

CROSS REFERENCE TO RELATED APPLICATIONS

This application is a Continuation of International Application No. PCT/CN2022/087499, filed on Apr. 18, 2022, which claims priority of Chinese Patent Application No. 202110412250.6, filed on Apr. 16, 2021, Chinese Patent Application No. 202110414061.2, filed on Apr. 16, 2021, the entire contents of each of which are incorporated herein by reference.

TECHNICAL FIELD

The present disclosure generally relates to imaging field and in particular, to systems and methods for dual-energy CT imaging.

BACKGROUND

When a CT (Computed Tomography) machine is used for scanning, a radiation source may emit X-rays to an inspected part of an object, and a detector may be used to receive and detect attenuated X-rays passing through the inspected part. A tomographic image including the inspected part of the object may be reconstructed through a computer-based on data generated by the detector after detecting attenuated X-rays. The tomographic image may be used for the inspection of various diseases. Specifically, the dual-energy CT imaging technique has been widely used for imaging. The dual-energy CT imaging technique has higher detection accuracy and can accurately obtain the material information of the scanned object. However, the existing dual-energy CT imaging manners have some inconveniences in practical application. For example, the scanning time of the dual-energy CT is longer, which may bring a higher radiation dose to the object.

Therefore, it is desirable to provide methods and systems for dual-energy CT imaging to reduce scanning time, thereby reducing the radiation dose to the object.

SUMMARY

One aspect of the embodiments of the present disclosure provides a method for imaging. The method may comprise obtaining a first image and topology data of an object, and the first image may be obtained by scanning the object under a first energy level. The method may comprise determining a base material density image corresponding to the object. The method may comprise determining, based on the first image, the base material density image, and the topology data, a second image corresponding to the first image. The second image may correspond to a second energy level, and the second energy level may be different from the first energy level.

In some embodiments, the second energy level may exceed the first energy level.

In some embodiments, the first image may correspond to a first energy level, and the second image may correspond to a second energy level that exceeds the first energy level.

In some embodiments, the topology data may include a difference between first topology data and second topology data of the object respectively corresponding to the first energy level and the second energy level, and the determining, based on the first image, the base material density image, and the topology data, a second image corresponding to the first image may include determining, based on the base material density image and the difference between first topology data and second topology data of the object, an image decomposition matrix difference. The determining, based on the first image, the base material density image, and the topology data, a second image corresponding to the first image may include determining, based on the base material density image and the image decomposition matrix difference, an image difference. The determining, based on the first image, the base material density image, and the topology data, a second image corresponding to the first image may include determining, based on the first image and the image difference, the second image.

In some embodiments, the determining, based on the base material density image and the difference in the topology data, an image decomposition matrix difference may include determine, based on the base material density image, material density data. The determining, based on the base material density image and the difference in the topology data, an image decomposition matrix difference may include determining, based on the material density data and the difference between first topology data and second topology data of the object, the image decomposition matrix difference.

In some embodiments, the first topology data may be obtained from scan data corresponding to the first image, or obtained by an imaging device via scanning the object under the first energy level.

In some embodiments, the determining a base material density image corresponding to the object may include determining, by processing the first image based on a matrix inverse decomposition or an iterative material decomposition, the base material density image.

In some embodiments, the determining a base material density image may include determining, by processing the first image based on a trained image processing model, the base material density image.

In some embodiments, the trained image processing model may be obtained by operations. The operations may include obtaining a plurality of training samples. The operations may include determining, by training a preliminary image processing model based on the plurality of training samples, the trained image processing model, wherein each training sample in the plurality of training samples may include a sample first image of a sample subject, a sample second image of the sample subject, sample topology data of the sample subject, and a label base material density image corresponding to the sample first image.

In some embodiments, the determining, by training a preliminary image processing model based on the plurality of training samples, the trained image processing model may include for each training sample, determining, based on the preliminary image processing model, a predicted base material density image corresponding to the sample subject. The determining, by training a preliminary image processing model based on the plurality of training samples, the trained image processing model may include adjusting, based on the predicted base material density image, a parameter of the primary image processing model to optimize a value of a target loss function, and obtaining the trained image processing model, wherein the target loss function may be determined based on at least one of the label base material density image, the sample first image, the sample second image, or the sample topology data.

In some embodiments, the target loss function may include at least one of a first function, a second function, a third function, or a fourth function. The first function may be determined based on the label base material density image.

The second function may be determined based on the sample first image. The third function may be determined based on the sample second image. The fourth function may be determined based on the sample second image and the sample topology data.

In some embodiments, the sample topology data may include sample first topology data and sample second topology data, and the fourth function may be determined according to operations, and the operations may include determining, based on the predicted base material density image, the sample first image, and the sample topology data, a sample auxiliary image. The operations may include determining, based on the sample auxiliary image, the fourth function.

In some embodiments, the determining, based on the predicted base material density image, the sample first image, and the sample topology data, a sample auxiliary image may include determining, based on the predicted base material density image, sample material density data. The determining, based on the predicted base material density image, the sample first image, and the sample topology data, a sample auxiliary image may include determining, based on the sample first topology data and the sample second topology data, a difference in the sample topology data. The determining, based on the predicted base material density image, the sample first image, and the sample topology data, a sample auxiliary image may include determining, based on the sample material density data and the difference in the sample topology data, a sample image decomposition matrix difference. The determining, based on the predicted base material density image, the sample first image, and the sample topology data, a sample auxiliary image may include determining, based on the sample image decomposition matrix difference and the predicted base material density image, a sample image difference. The determining, based on the predicted base material density image, the sample first image, and the sample topology data, a sample auxiliary image may include determining, based on the sample first image and the sample image difference, the sample auxiliary image.

Another aspect of the embodiments of the present disclosure provides a system for imaging. The system may comprise at least one storage device including a set of instructions, and at least one processor in communication with the at least one storage device, wherein when executing the set of instructions, the at least one processor is configured to cause the system to obtain a first image and topology data of an object, and the first image may be obtained by scanning the object under a first energy level. The at least one processor is configured to cause the system to determine a base material density image corresponding to the object. The at least one processor is configured to determine, based on the first image, the base material density image, and the topology data, a second image corresponding to the first image. The second image may correspond to a second energy level, and the second energy level may be different from the first energy level.

According to yet another aspect of the present disclosure, a non-transitory computer readable medium may be provided. The non-transitory computer readable may include at least one set of instructions for imaging. When executed by one or more processors of a computing device, the at least one set of instructions may cause the computing device to perform a method. The method may comprise obtaining a first image and topology data of an object, and the first image may be obtained by scanning the object under a first energy level. The method may comprise determining a base material density image corresponding to the object. The method may comprise determining, based on the first image, the base material density image, and the topology data, a second image corresponding to the first image. The second image may correspond to a second energy level, and the second energy level may be different from the first energy level.

In some embodiments of the present disclosure, using the trained image processing model, the corresponding second image may be obtained based on the first image with single energy, which may reduce the radiation dose caused by scanning the object with rays. By introducing the topology data, more information may be obtained in the calculation process of solving the second image, thereby improving the accuracy of the post-processing result of the image with dual-energy. In addition, before the first image is input into the image processing model, processing such as denoising may not be necessary to be performed on the first image, which simplifies the process of acquiring the base material density image. The base material density image obtained based on the image processing model may avoid or reduce the serious degradation of the image signal-to-noise ratio caused by the matrix inversion of the image with dual-energy, and save the time required for iterative material decomposition.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is an exemplary flow chart illustrating a process for determining a second image according to some embodiments of the present disclosure;

FIG. 4 is an exemplary flow chart illustrating a process for training an image processing model according to some embodiments of the present disclosure;

FIG. 6 is an exemplary flow chart illustrating a process for determining a sample auxiliary image according to some embodiments of the present disclosure;

FIG. 9 is an exemplary flow chart illustrating a process for determining a sample auxiliary image according to some embodiments of the present disclosure;

FIG. 10 is an exemplary block diagram illustrating a processing device for obtaining an image according to some embodiments of the present disclosure; and FIG. 11 is an exemplary block diagram illustrating a processing device for training according to some embodiments of the present disclosure.

DETAILED DESCRIPTION

Figure 1:
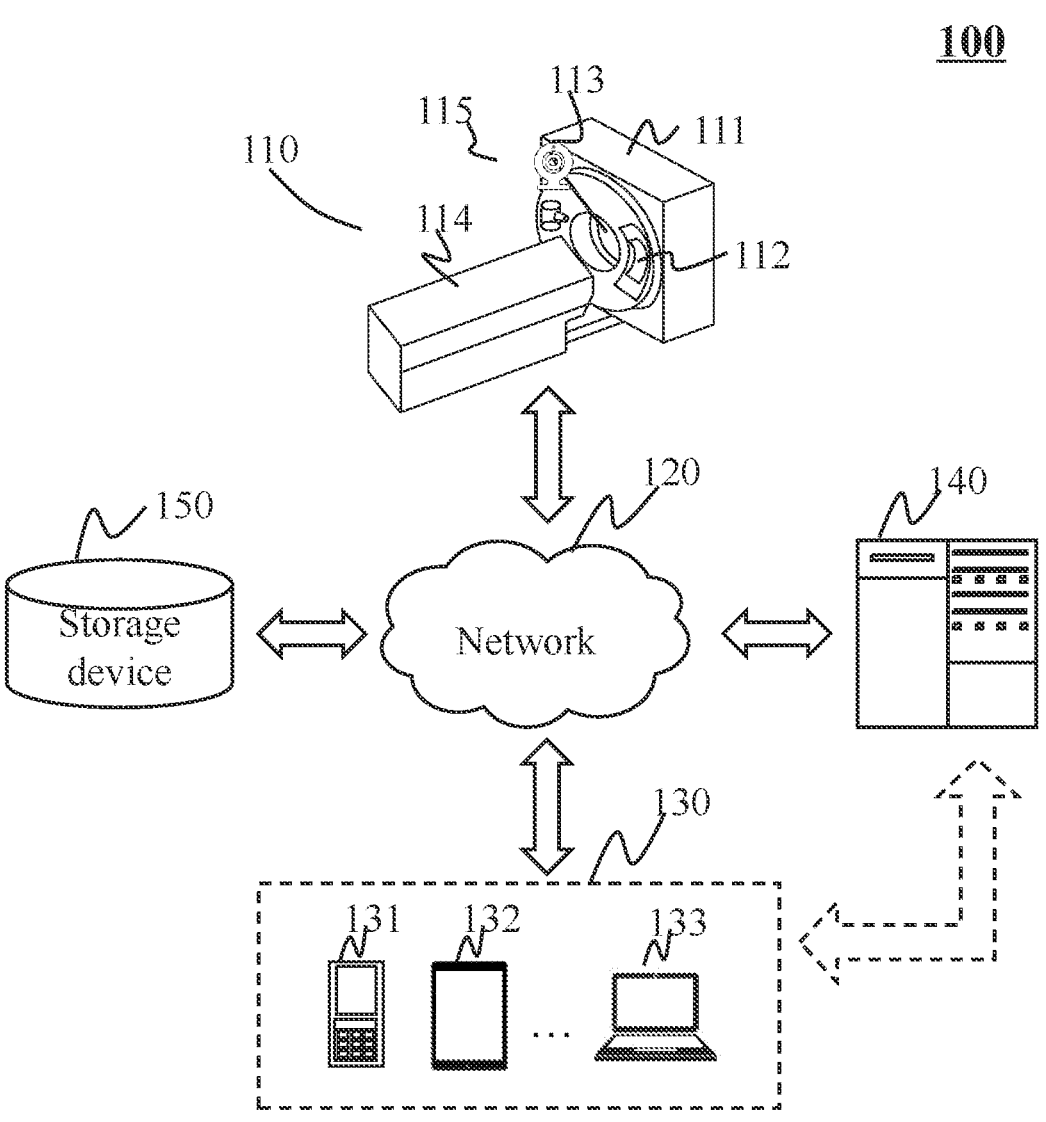
FIG. 1 is a schematic diagram illustrating an exemplary system for imaging according to some embodiments of the present disclosure.

Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

CT is currently widely used in clinical diagnosis, while DE CT (dual-energy CT) technology has developed rapidly and gradually become one of the commonly used examination manners in clinical diagnosis.

The current implementations of clinical DE CT imaging may be hardware design, for example, kVp switching technology, double-layer detector technology, dual-source CT imaging technology, a plurality of scanning technologies, or the like. A base material density image may be obtained directly in an image domain through matrix inversion or iterative material decomposition. Fast kVp switching technology uses only a single ray source, and achieves fast switching of high and low voltage through a single tube to acquire dual-energy data. The scanning time using the fast kVp switching technology may be long usually, and the ability to distinguish different energy levels may be poor. Therefore, the difference between a reconstructed image with high energy (also referred to as a high-energy image) and a reconstructed image with low energy (also referred to as a low-energy image) may be small, and an additional scan may be required. Dual-source CT imaging technology uses two radiation sources to emit X-rays at two energy levels (e.g., high energy level and low energy level). The two radiation sources may be at an angle relative to a rotation center. The two radiation sources may emit X-rays at the same time. The scanning ranges of low-energy rays and high-energy rays at the same time may be quite different. Although the dual-source CT imaging technology is capable of distinguishing different energy levels, the hardware implementation may be complicated. Since a certain angular offset exists between the two radiation sources, offset or distortion may be easily generated between images with dual-energy generated in an intense motion area, which may cause artifacts in the images obtained by material decomposition. In addition, the DE CT technology exemplified above may bring a large radiation dose to a patient.

Therefore, the present disclosure provides methods and systems for DE CT imaging with reduced radiation dose to a patient. Combined with machine learning technology, an image processing model obtained through training may be used to process a CT image with single energy (i.e., the first image, e.g., a low-energy image, or a high-energy image) and topology data to obtain the second image (i.e., a high-energy image, or a low-energy image), thereby reducing the radiation dose brought to an object when acquiring the second image.

FIG. 1 is a schematic diagram illustrating an exemplary system for imaging according to some embodiments of the present disclosure.

In some embodiments, a system 100 for processing an image may be used to obtain a CT image with high energy based on a CT image with low energy, or to obtain a CT image with low energy based on a CT image with high energy.

It should be noted that the first image and the second image described in the embodiments of the present disclosure may be 2D images or 3D images, which are not limited herein.

It should be noted that, in some embodiments, an image with dual-energy may refer to the CT image with high energy and the CT image with low energy corresponding to the CT image with high energy. For example, when the first image is the CT image with low energy, the corresponding second image may be the CT image with high energy; when the first image is the CT image with high energy, the corresponding second image may be the CT image with low energy.

In some embodiments, an image processing model may be obtained through training in other systems (e.g., a training system for processing an image model, which is not shown in the figure), or may be obtained through training in the system 100 for processing an image. For example, the system 100 for processing an image may acquire a plurality of training samples, and each training sample in the plurality of training samples may include a sample first image. The plurality of training samples may be input into the image processing model to determine the base material density image corresponding to the sample first image. Based on one or more label base material density images, the sample first image, a sample second image, and sample topology data, and the base material density image, a trained image processing model may be obtained through adjusting parameters of the image processing model to optimize a target loss function. The sample second image may correspond to the sample first image.

As shown in FIG. 1, the system 100 for processing an image may include an imaging device 110, a network 120, a terminal 130, a processing device 140, and a storage device 150.

The imaging device 110 may be used to perform the imaging of an object to generate an image. The imaging device 110 may be a medical imaging device (e.g., CT). In some embodiments, the imaging device 110 may include a gantry 111, a detector apparatus 112, a scanning area 113, and a scanning couch 114.

The processing device 140 may process data and/or information obtained from the imaging device 110, the terminal 130, and/or the storage device 150. For example, the processing device 140 may process the image information detected and generated by the detector 112 to obtain a CT image. As another example, the processing device 140 may process the CT image with low energy to obtain the CT image with high energy corresponding to the CT image with low energy using a trained machine learning model for image processing or process the CT image with high energy to obtain the CT image with low energy corresponding to the CT image with high energy using another trained machine learning model for image processing. As a further example, the processing device 140 may determine a base material density image corresponding to the CT image with low energy based on the CT image with low energy using the trained machine learning model for image processing and determine, based on the CT image with low energy, the base material density image, and topology data, the CT image with high energy corresponding to the CT image with low energy, the second image. In some embodiments, the determination and/or updating of the trained machine learning model for image processing (also referred to as an image processing model) may be performed on a processing device, while the application of the trained image processing model may be performed on a different processing device. In some embodiments, the determination and/or updating of the trained machine learning model may be performed on a processing device of a system different than the system 100 or a server different than a server including the processing device 140 on which the application of the trained machine learning model is performed. For instance, the determination and/or updating of the trained machine learning model may be performed on a first system of a vendor who provides and/or maintains such an image processing model and/or has access to training samples used to determine and/or update the trained machine learning model, while performing imaging on an image based on the provided image processing model, may be performed on a second system of a client of the vendor. In some embodiments, the determination and/or updating of the trained machine learning model may be performed online in response to a request for imaging. In some embodiments, the determination and/or updating of the trained machine learning model may be performed offline.

The terminal 130 may include a mobile device 131, a tablet computer 132, . . . , a laptop computer 133, or the like, or any combination thereof. In some embodiments, the terminal 130 may be in communication with other components of the system 100 for processing an image via the network. For example, the terminal 130 may send one or more control instructions to the imaging device 110 to control the imaging device 110 to scan the object according to the instructions. As another example, the terminal 130 may also receive the base material density image determined by the processing device 140, and display the base material density image to an operator for analysis and confirmation. In some embodiments, the terminal 130 may be part of the processing device 140. In some embodiments, the terminal 130 may be integrated with the processing device 140 as a console for the imaging device 110. For example, a user or an operator (e.g., a doctor) of the system 100 for processing an image may control the operation of the imaging device 110 through the console, such as scanning the object, controlling the movement of the scanning couch 114, training the image processing model, acquiring the base material density image, acquiring the second image based on the first image and the topology data, or the like.

The storage device 150 may store data (e.g., scan data of the object), instructions, and/or any other information. In some embodiments, the storage device 150 may store data obtained from the imaging device 110, the terminal 130, and/or the processing device 130. For example, the storage device 150 may store a treatment plan, scan data of an object, or the like, obtained from the imaging device. In some embodiments, the storage device 150 may store data and/or instructions that the processing device 140 may execute or use to perform exemplary methods described in the present disclosure.

In some embodiments, the storage device 150 may be connected to the network 120 to communicate with one or more other components (e.g., the processing device 140, the terminal 130, etc.) in the system 100 for processing an image. One or more components in the system 100 for processing an image may access the data or instructions stored in the storage device 150 via the network 120. In some embodiments, the storage device 150 may be part of the processing device 140, or the storage device 150 may be independent, directly or indirectly connected to the processing device.

The network 120 may include any suitable network that can facilitate the exchange of information and/or data for the system 100 for processing an image. In some embodiments, one or more components (e.g., the imaging device 110, the terminal 130, the processing device 140, the storage device 150, etc.) of the system 100 for processing an image may communicate information and/or data with one or more other components of the system 100 for processing an image via the network 120. For example, the processing device 140 may obtain scan data from the imaging device 110 via the network 120. In some embodiments, the network 120 may include one or more network access points. For example, the network 120 may include wired and/or wireless network access points such as base stations and/or internet exchange points through which one or more components of the system 100 for processing an image may be connected to the network 120 to exchange data and/or information.

Figure 2:
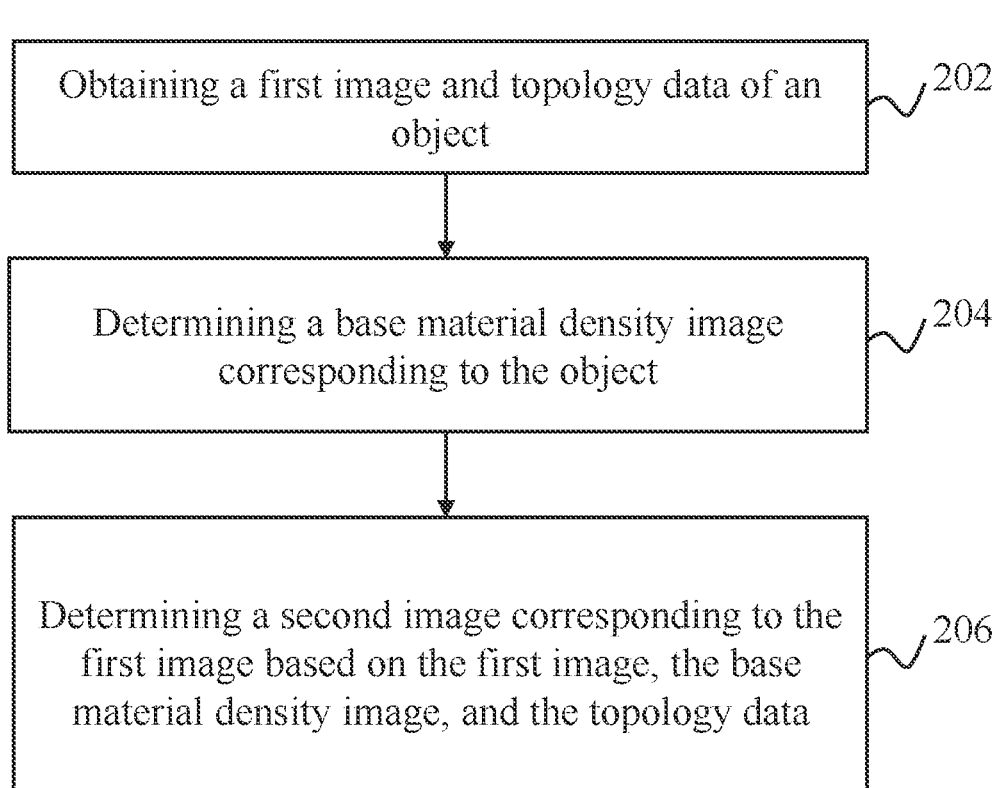
FIG. 2 is an exemplary flow chart illustrating a process for imaging according to some embodiments of the present disclosure.

FIG. 2 is an exemplary flow chart illustrating a process for imaging according to some embodiments of the present disclosure. In some embodiments, a process 200 may be performed by a processing device (e.g., the processing device 140 or the processing device 1000 as described in FIG. 10). For example, the process 200 may be stored in the storage device (such as a built-in storage unit of the processing device or an external storage device) in the form of programs or instructions. When the programs or instructions are executed, the process 200 may be implemented. The process 200 may include obtaining a first image and topology data of an object, the first image being obtained by scanning the object under a first energy level; determining a base material density image corresponding to the first image; and determining, based on the first image, the base material density image, and the topology data, a second image corresponding to the first image, the second image corresponding to a second energy level.

The first image may be a real image that is obtained by scanning the object under the first energy level. The second image may be a simulated image that is obtained based on the first image. The second energy level may be an equivalent energy level that refers to an energy level the second image needs if the second image is obtained by scanning the object using the scanner via emitting radiation beams to the object.

In some embodiments, the first energy level may be less than the second energy level. In other words, the first image may be an image with low energy and the second image may be an image with high energy. The image with high energy may be generated based on the image with low energy according to process 200.

In some embodiments, the first energy level may exceed the second energy level. In other words, the first image may be an image with high energy and the second image may be an image with low energy. The image with low energy may be generated based on the image with high energy according to process 200.

It should be noted that, in the embodiments of the present disclosure, for the convenience of description, the first image being an image with low energy and the second image being an image with high energy may be taken as an example for description, which is for example purposes only. It should be understood that the first image may be the image with high energy, and the second image may be the image with low energy, which is not limited in the present disclosure.

In operation 202, a first image and topology data of the object may be obtained. In some embodiments, the operation 202 may be performed through an obtaining module 1002.

The object may include a patient or other medical experimental objects (e.g., other animals such as experimental mice or phantom), or the like. The object may also be part of the patient or part of other medical experimental objects, which may include organs and/or tissues, such as the heart, lungs, ribs, abdominal cavity, or the like.

In some embodiments, the first image may include a CT image with low energy obtained by scanning and performing imaging on the object with a low energy level, and the corresponding second image may be a CT image of the object with high energy. In some embodiments, the first image may be a CT image with high energy obtained by scanning and performing imaging on the object with a high energy level, and the corresponding second image may be a CT image with low energy.

The topology data may refer to scan data (or projection data) of an object acquired when the object is scanned by radiation rays traveling at a certain angle. For example, the topology data may be a sum of the line integrals of the attenuation of radiation rays passing through the object along a route at a certain angle. The certain angle may refer to an angle between the route of the radiation rays and a plane (e.g., a transverse plane). The certain angle may be any angle, such as a scanning angle corresponding to a transverse plane (i.e., the route being parallel with the transverse plane), a scanning angle corresponding to a coronal plane (i.e., the route being parallel with the coronal plane), a scanning angle corresponding to a sagittal plane (i.e., the route being parallel with the sagittal plane), or other angles (e.g., the route having the certain angle with the transverse plane, or the coronal plane, or the sagittal plane, etc.).

The topology data may include the first topology data and the second topology data. The first topology data may correspond to a first energy level and the second topology data may correspond to a second energy level. In some embodiments, if the first image is the CT image with low energy, the first topology data may refer to topology data scanned by rays at a lower energy level (e.g., a working electric potential of an X-rays apparatus may be 80 kVp), and the second topology data may refer to topology data scanned by rays at a higher energy level (e.g., a working electric potential of an X-rays apparatus may be 140 kVp). In other words, the first energy level may be less than the second energy level. In some embodiments, if the first image is the CT image with high energy, the first topology data may also refer to topology data that is obtained by scanning the object with radiation rays (e.g., X-rays) at a higher energy level, and the second topology data may also refer to topology data that is obtained by scanning the object with radiation rays at a lower energy level. In other words, the first energy level may exceed the second energy level. The first topology data may correspond to the second topology data. For example, the first topology data and/or the second topology data may be obtained by scanning the same object. In some embodiments, the scanning angles of the first topology data and the second topology data may be the same. In some embodiments, the scanning angles of the topology data and the first image may be different, so that information of different angles may be included in the topology data and the first image, thereby obtaining more information.

In some embodiments, the first image and the first topology data may be obtained through scanning the object under the first energy level, and the second topology data may be obtained through scanning the object under the second energy level. For example, the imaging device may scan the object using radiation rays (e.g., X-rays, etc.) with a lower energy level (e.g., the first energy level, a working electric potential of an X-rays apparatus may be 80 kVp) to obtain the first image and the first topology data. As another example, the imaging device may scan the object using radiation rays (e.g., X-rays, etc.) with a lower energy level (e.g., the first energy level, a working electric potential of an X-rays apparatus may be 80 kVp) to obtain scan data corresponding to the first image and the first topology data may be obtained from the scan data corresponding to the first image. For example, the scan data obtained from a certain angle may be extracted from the scan data corresponding to the first image and designated as the first topology data. As still another example, the first topology data may be obtained through scanning the object under the first energy level. The imaging device may obtain the second topology data through scanning with radiation rays with higher energy (e.g., the second energy level, a working electric potential of an X-rays apparatus may be 140 kVp) relative to the radiation rays with low energy. The first energy level may be different from the second energy level.

In some embodiments, the processing device may read or call relevant data interfaces from the imaging device, a database, the storage device, or in other ways. For example, the first image and the topology data of the object may be obtained from the imaging device.

In operation 204, the base material density image corresponding to the object may be determined. In some embodiments, the operation 204 may be performed through a first determination module 1004.

The base material density image may refer to an image representing various types of materials after the CT image is decomposed.

CT imaging may be considered as attenuation coefficient imaging. The principle of CT imaging may be that X-rays may penetrate an object (e.g., a living body, an object), and different tissues of the object with different densities may have different absorption and transmittance of the X-rays. When the X-rays pass through the object, the attenuation of different parts may be different, and data of different parts of the object indicating attenuation coefficients of different parts may be obtained by measuring the attenuated rays of different parts of the object. After inputting the acquired data into an electronic computer for processing, a cross-sectional or three-dimensional image of the object may be reconstructed. An attenuation coefficient of any part of the object may be expressed as a linear combination of selected materials. Since each pixel value in the CT image has a linear relationship with the linear attenuation coefficient of a part of the object corresponding to the pixel, the CT image of the object may be represented as a linear combination of selected materials. For example, the CT image may be represented by Equation (1):

$$I = M \cdot A, \tag{1}$$

wherein, I refers to a CT image (e.g., the first image) with a dimension of N×1, N refers to the total number of pixels in the CT image, M refers to a base material density image with a dimension of N×m, m refers to the type of a decomposed material, A refers to a material decomposition matrix with a dimension of m×1. Each element in a material decomposition matrix may represent a mass attenuation coefficient of a material at an energy level.

In some embodiments, the processing device may process the first image using an image processing model to obtain the base material density image corresponding to the first image. For example, the processing device may input the first image into the image processing model, and the image processing model may output the base material density image after processing the first image. In some embodiments, the image processing model may include a trained machine learning model, such as a deep learning-based U-net model, a deep learning-based V-net model, or the like.

The image processing model may be obtained through training a preliminary image processing model. The preliminary image processing model may be a machine learning model that has not been trained using any training sample or a previous image processing model that has been trained using training samples. For example, the processing device may obtain a plurality of training samples, and each training sample in the plurality of training samples may include a sample first image (e.g., a sample image with low energy). Each of the plurality of training samples may be input into the preliminary image processing model, and an estimated base material density image corresponding to the sample first image may be determined by the preliminary image processing model. Based on a label base material density image corresponding to the sample first image, the sample first image (e.g., the sample image with low energy), a sample second image corresponding to the sample first image (e.g., a sample image with high energy), sample topology data, and the estimated base material density image, the trained image processing model may be obtained through adjusting the parameters of the preliminary image processing model to optimize a target loss function.

In some embodiments, if the first image is the image with low energy, the sample first image may be an image with low energy. In other words, the energy level corresponding to the sample first image may be less than the energy level corresponding to the sample second image. In some embodiments, if the first image is the image with high energy, the sample first image may be an image with high energy. In other words, the energy level corresponding to the sample first image may exceed the energy level corresponding to the sample second image. For more details about the training of the image processing model, refer to the relevant descriptions of FIG. 4 to FIG. 8, which is not be repeated herein.

In some embodiments, the processing device may obtain the base material density image of the first image through a direct matrix inversion decomposition technique (including a two-base decomposition technique, a three-base decomposition technique, or a multi-base decomposition technique, etc.) or an iterative material decomposition technique based on the first image. For example, the processing device may determine the base material density image by processing the first image based on the matrix inversion decomposition or iterative material decomposition. The processing device may process the CT image under high dose through direct matrix inversion decomposition to obtain the base material density image. The processing device may also process the CT image under conventional dose through iterative material decomposition to obtain the base material density image.

In operation 206, a second image corresponding to the first image may be determined based on the first image, the base material density image, and the topology data. In some embodiments, the operation 206 may be performed through a third determination module 1008.

The second image may be an image obtained after a series of processing based on the first image and the topology data. In some embodiments, the second image may be an image with high energy, for example, when the first image is an image with low energy. In some embodiments, the second image may be an image with low energy, for example, when the first image is an image with high energy.

In some embodiments, the topology data may include the first topology data and the second topology data as described in the operation 202. The second image corresponding to the first image may be determined based on the first image, the base material density image, and a difference in the topology data. The difference in the topology data may refer to the difference between energy topology data with two different energy levels, i.e., between the first topology data and the second topology data, for example, the difference between the topology data of 80 kVp and the topology data of 140 kVp.

In some embodiments, if the second topology data corresponds to a high energy level relative to the first topology data, the processing device may use the second topology data to subtract the first topology data to obtain the difference in the topology data. In some embodiments, if the first topology data corresponds to a high energy level relative to the second topology data, the processing device may use the first topology data to subtract the second topology data to obtain the difference in the topology data. For example, topology data with high energy may be used to minus topology data with low energy, or topology data with low energy may be used to minus topology data with high energy to obtain the difference in the topology data.

In some embodiments, to determine the second image corresponding to the first image based on the first image, the base material density image, and a difference in the topology data, the processing device may determine an image decomposition matrix difference based on the base material density image and the difference in the topology data. The processing device may determine an image difference between the first image and the second image based on the base material density image and the image decomposition matrix difference. The processing device may also determine the second image based on the first image and the image difference. For more descriptions about the determination of the second image, refer to FIG. 3 and the related descriptions, which are not repeated herein.

In some embodiments of the present disclosure, the processing device may obtain the second image corresponding to the first image through obtaining the base material density image and the corresponding topology data. Since the imaging device is usually required to scan the object from a plurality of scanning angles when obtaining images with dual-energy (e.g., a high-energy image and a low energy image), the scanning time may be long, which cause more radiation received by the object. According to the present disclosure, as the topology data may only be obtained through scanning the object from a certain angle, compared with scanning from the plurality of angles, the time required for scanning from a single angle may be greatly reduced, thereby effectively reducing the radiation dose to the object.

In addition, compared with the manner of directly using the first image to obtain the second image, in the embodiments of the present disclosure, by introducing the topology data, more information related to the object may be obtained in the process of determining the second image, so as to achieve the purpose of improving the accuracy of the second image, (i.e., accuracy of the DE CT values) and the accuracy of the post-processing results based on dual-energy images (i.e., the first image and the second image).

FIG. 3 is an exemplary flow chart illustrating a process for determining a second image according to some embodiments of the present disclosure. In some embodiments, a process 300 may be performed by a processing device (e.g., the processing device 140 or the processing device 1000 as described in FIG. 10). As shown in FIG. 3, the process 300 may include determining an image decomposition matrix difference based on a base material density image corresponding to a first image of an object and a difference in topology data of the object; determining an image difference based on the base material density image and the image decomposition matrix difference; and determining a second image based on the first image and the image difference. Operation 206 may be performed according to process 300 as described in FIG. 3.

In operation 302, an image decomposition matrix difference may be determined based on a base material density image and a difference between first topology data and second topology data of the object. The image decomposition matrix difference may be denoted by a matrix with size n*n, e.g., 2*2.

The first image may correspond to a first energy level. The topology data may include first topology data and second topology data or a difference between the first topology data and second topology data. The first topology data may correspond to a first energy level or the first energy level and the second topology data may correspond to a second energy level. The base material density image corresponding to the first image may be determined based on the first image and the topology data of the object using a trained machine learning model. More descriptions for the first image, the topology data, and the base material density image may be found elsewhere in the present disclosure (e.g., FIG. 2 and the descriptions thereof).

The image decomposition matrix difference may refer to a difference between an image decomposition matrix of the first image and an image decomposition matrix of a second image corresponding to the first image. The second image may correspond to a second energy level that is different from the first energy level.

In some embodiments, the image decomposition matrix difference may be determined based on material density data and the difference in the topology data (i.e., the difference between the first topology data and second topology data). The material density data may be obtained by performing a forward projection on the base material density image.

For example, the first image and the second image (i.e., dual-energy images) may be represented by the following Equation (2) and Equation (3), respectively:

$$I_{Low} = M \cdot A_{Low}, \qquad (2)$$

$$I_{High} = M \cdot A_{High}, \qquad (3)$$

wherein, $I_{Low}$ refers to a low-energy image (e.g., the first image), $I_{High}$ refers to a high-energy image (e.g., the second image), $A_{Low}$ refers to the material decomposition matrix of the low-energy image (e.g., the first image), $A_{High}$ refers to the material decomposition matrix of the high-energy image (e.g., the second image), and M refers to the base material density image.

Equation (4) as follows may be obtained by subtracting Equation (2) from Equation (3):

$$I_{diff} = M \cdot A_{diff}, \qquad (4)$$

wherein, $I_{diff}$ refers to the difference between the second image and the first image (also referred to as an image difference between the low-energy image and the high-energy image), and $A_{diff}$ refers to the image decomposition matrix difference between the material decomposition matrix of the second image and the material decomposition matrix of the first image.

The forward projection may be performed simultaneously on two sides of Equation (4), and the symbol of the forward projection may be marked as R. Equation (5) may be obtained after the forward projection:

$$R \cdot I_{diff} = R \cdot M \cdot A_{diff}, \qquad (5)$$

wherein, $R \cdot I_{diff}$ refers to a difference in energy data of the second image and the first image, $R \cdot M$ refers to the material density data of the base material density image, and $A_{diff}$ refers to the image decomposition matrix difference between the material decomposition matrix of the second image and the material decomposition matrix of the first image. The difference in energy data of the second image and the first image may be the difference in the topology data. In some embodiments, $A_{diff}$ may be obtained based on Equation (5) through using the least squares fitting technique.

Based on the description mentioned above, in some embodiments, the processing device may determine the image decomposition matrix difference based on the procedures exemplified in the following embodiments.

In some embodiments, the processing device may determine the material density data based on the base material density image. For example, the processing device may perform the forward projection on the base material density image to obtain the material density data.

The processing device may determine the image decomposition matrix difference based on the material density data and the difference in the topology data.

For example, the processing device may subtract the first topology data from the second topology data to obtain the difference in the topology data. The processing device may obtain the image decomposition matrix difference based on the material density data and the difference in the topology data according to Equation (5). $R \cdot I_{diff}$ refers to the difference in the topology data, which may represent the energy difference between the second topology data and the first topology data or the energy difference between the first image and the second image. The material density data may be obtained through performing the forward projection on the base material density image, that is, $R \cdot M$. The image decomposition matrix $A_{diff}$ may be obtained through the least squares fitting technique according to Equation (5). In some embodiments, the second topology data may refer to topology data of a ray energy level corresponding to the second image, and the first topology data may refer to topology data of a ray energy level corresponding to the first image.

In operation 304, an image difference may be determined based on the base material density image and the image decomposition matrix difference.

The image difference may be a difference between the second image and the first image. In some embodiments, after the image decomposition matrix difference is obtained based on the difference in the topology data and the base material density image, the image difference may be obtained through Equation (4) exemplified above. In Equation (4), M refers to the base material density image, and $A_{diff}$ refers to the image decomposition matrix difference. The base material density image M and the image decomposition matrix difference $A_{diff}$ may be substituted into Equation (4) to obtain the image difference. That is, the image difference $I_{diff}=M \cdot A_{diff}$ may be obtained.

In operation 306, the second image may be determined based on the first image and the image difference.

In some embodiments, the processing device may determine the second image based on the first image and the image difference. According to Equation (2), Equation (3), and Equation (4), since $I_{diff}=I_{High}-I_{Low}$ and $M \cdot A_{diff}$ have been obtained, if the first image is the low-energy image, the second image may be obtained by adding the image difference to the first image. That is, $I_{High}=I_{Low}+I_{diff}$.

If the first image is the high-energy image, the second image may be obtained by subtracting the image difference from the first image. That is, $I_{low}=I_{high}-I_{diff}$. The second image may correspond to a second energy level, and the second energy level may exceed the first energy level.

FIG. 4 is an exemplary flow chart illustrating a process for training an image processing model according to some embodiments of the present disclosure. In some embodiments, a process 400 may be performed by a processing device (e.g., the processing device 140 or the processing device 1000 as described in FIG. 10).

In operation 402, a plurality of training samples may be obtained.

In some embodiments, each training sample in the plurality of training samples may include a sample first image of a sample subject, a sample second image of the sample subject, sample topology data of the sample subject, a label base material density image of the sample subject, or a combination thereof. The sample first image may be obtained by scanning the sample subject with radiation rays corresponding to a first energy level or first energy level.

The sample second image of the sample subject may correspond to a second energy level or second energy level. The first energy level may be different from the second energy level. For example, the first energy level may be less than the second energy level or exceed the second energy level. The first energy level may be different from the second energy level. The first energy level may be different from the second energy level. For example, the first energy level may be less than the second first energy level or exceed the second first energy level. In some embodiments, the sample second image may be obtained by scanning the sample subject with radiation rays corresponding to the second energy level or the second energy level. In some embodiments, the sample second image may be determined based on the first sample image, the sample topology data, and the label base material density image according to process 200.

In some embodiments, the sample topology data may include a difference between first sample topology data and second sample topology data corresponding to different energy levels (e.g., the first energy level or the second energy level). In some embodiments, the sample topology data may include the first sample topology data and the second sample topology data. In some embodiments, the sample topology data of the sample subject may be obtained simultaneously with the acquisition of the training samples. For example, the first sample topology data may be extracted from the scan data corresponding to the sample first image, and the second sample topology data may be extracted from the scan data corresponding to the sample second image.

In some embodiments, data of a training sample for training the image processing model may include the label base material density image, the sample first image, the sample second image, and the sample topology data.

The label base material density image may also be referred to as a reference base material density image. The label base material density image may be a desired output in the training. The sample first image, the sample second image, and/or the sample topology data may be an input in the training. The label base material density image may be obtained through a direct matrix inversion decomposition technique (including a two-base decomposition technique, a three-base decomposition technique, or a multi-base decomposition technique, etc.) or an iterative material decomposition technique based on the sample first image. In some embodiments, the processing device may obtain the plurality of training samples through reading from the database, the storage device, or the imaging device.

In operation 404, each of the plurality of training samples may be input into a preliminary image processing model to determine a predicted (or estimated) base material density image corresponding to the sample first image.

In some embodiments, the processing device may input the plurality of training samples (e.g., the sample first image, the sample second image, the sample topology data) into the preliminary image processing model, and the image processing model may output the predicted base material density image (also referred to an actual output) corresponding to each of the plurality of training samples after processing the input.

In some embodiments, the predicted base material density image corresponding to each training sample output by the image processing model may be used to perform constraint training on the image processing model.

In operation 406, based on the label base material density image and the predicted base material density image, a trained image processing model may be obtained by adjusting parameters of the preliminary image processing model to optimize a target loss function.

In some embodiments, the processing device may input each of the plurality of training samples into the preliminary image processing model to be trained, conduct constraint based on the prediction results of the image processing model (i.e., the predicted base material density image).

The target loss function may be constructed based on one or more of the label base material density image, the sample first image, the sample second image, and the sample topology data. The value of the target loss function corresponding to the each training sample may be optimized by continuously adjusting the parameters of the preliminary image processing model in the training process. For example, the value of the target loss function may be minimized to make the prediction results of the preliminary image processing model be more accurate. The trained image processing model may be obtained when the value of the target loss function meets the requirements (e.g., less than a certain preset value, the value of the loss function converges) or when the iteration reaches a preset number of times.

In some embodiments, the target loss function may be any one or a combination of a loss function associated with the base material density image (also referred to as a first function), a loss function associated with the sample first image (also referred to as a second function), a first loss function associated with the sample second image (also referred to as a third function), and a second loss function associated with the sample second image (also referred to as a fourth function). For example, the target loss function may be a combination of the loss function associated with the base material density image and the loss function associated with the sample first image, or a combination of the loss function associated with the base material density image, the loss function associated with the sample first image, the first loss function associated with the sample second image, and the second loss function associated with the sample second image, or the like.

In some embodiments, the loss function associated with the base material density image may be determined based on the label base material density image. For example, the loss function associated with the base material density image may be constructed based on the predicted base material density image predicted by the image processing model and the label base material density image. In some embodiments, the loss function associated with the base material density image may represent a difference between the predicted material density and the label material density. The loss function associated with the base material density image may be used to constraint a difference between the predicted base material density image predicted by the image processing model and a label base material density image corresponding to the predicted base material density image in the training. For example, the loss function associated with the base material density image may be denoted as Equation (6):

$$L_{Maerial} = \frac{1}{N}\|F(I_{Low}) - \text{Material}\|_2^2, \tag{6}$$

wherein, $L_{Material}$ refers to the loss function associated with the base material density image, $I_{Low}$ refers to the sample first image, $F(I_{Low})$ refers to the predicted base material density image predicted by the preliminary image processing model, Material refers to the label base material density image, and N refers to the total number of training samples used for training. In some embodiments, the label base material density image may be obtained through direct matrix inversion decomposition or iterative material decomposition based on the sample first image and the sample second image.

In some embodiments, the loss function associated with the base material density image determined through the processing device may be as shown in Equation (6).

In some embodiments, the processing device may determine the difference between the predicted base material density image and the label base material density image based on the loss function associated with the base material density image exemplified in the operation 204 (i.e., Equation (6)). For example, the predicted base material density image and the label base material density image may be substituted into Equation (6) for the calculation to obtain the value of the loss function associated with the base material density image. The value of the loss function associated with the base material density image may reflect the difference between the predicted base material density image and the label base material density image. By minimizing the loss function, a variance may be reduced, thereby making the prediction results of the model be more accurate.

In the embodiment, the processing device may directly construct the target loss function based on the label base material density image to constrain the training of the preliminary image processing model, and the prediction results of the preliminary image processing model may be close to the label base material density image obtained based on the CT image with dual-energy (e.g., the sample first image and the sample second image). After the preliminary image processing model is trained based on the plurality of training samples, the trained image processing model may be obtained. A predicted base material density image of a first image (e.g., a low-energy image or a high-energy image) may be obtained through inputting the first image into the trained image processing model, which realizes the function of decomposing the substance material by using a CT image with single energy. Since the predicted base material density image is obtained only through using the CT image with single energy, compared with the use of the CT images with dual-energy requiring a plurality of scans of the object to obtain the base material density image, the scan time of the base material density image obtained only through using the CT image with single energy may be shorter, and the radiation dose reaching to the object may be lower.

In some embodiments, the loss function associated with the first image (which may also be referred to as a loss function associated with an image with low energy) may be determined based on at least the sample first image. The loss function associated with the first image may be determined based on the sample first image and a predicted first image. In some embodiments, the predicted first image may be determined based on the predicted base material density image and the sample first image. For example, the predicted first image may be obtained by multiplying the predicted base material density image by a material decomposition matrix corresponding to the sample first image. The material decomposition matrix of the sample first image may be obtained through solving the sample first image and the predicted base material density image by ways of the least square fitting according to Equation (2). For more details, refer to the relevant description of the image decomposition matrix solution in FIG. 3, which is not be repeated herein.

For example, in some embodiments, the loss function associated with the first image may be represented by Equation (7).

$$L_{Low} = \frac{1}{N}\|I_{Low}^{DL} - I_{Low}\|_2^2, \tag{7}$$

wherein, $$I_{Low}^{DL}$$

refers to a predicted low-energy image (e.g., a predicted first image), $I_{Low}$ refers to a sample low-energy image (e.g., the sample first image), and N refers to the total number of training samples. The value of the loss function associated with the first image may reflect the difference between the predicted first image and the sample first image, and the predicted first image may be obtained based on the predicted base material density image. For example, the predicted first image may be obtained by multiplying the predicted base material density image by the material decomposition matrix. Therefore, the value of the loss function associated with the first image may indirectly reflect the accuracy of the prediction results of the model.

In some embodiments, the loss function associated with the first image may be used to constraint the difference between the predicted first image and the sample first image.

In some embodiments, the loss function associated with the second image (which may also be referred to as a first loss function associated with an image with high energy, i.e., high-energy image) may be determined based on at least the sample second image. For example, the loss function associated with the second image may be constructed based on the sample second image and a predicted second image. In some embodiments, the predicted second image may be determined based on the predicted base material density image and the sample second image. For example, the predicted second image may be obtained by multiplying the predicted base material density image with a material decomposition matrix corresponding to the sample second image to obtain the predicted second image. The material decomposition matrix of the sample second image may be obtained by solving the sample second image and the predicted base material density image by the least square fitting technique according to Equation (2) as described in FIG. 2. For more details, refer to the related description of FIG. 3, which is not be repeated herein.

For example, in some embodiments, the first loss function associated with the sample second image $L_{High-1}$ may be as denoted as Equation (8):

$$L_{High-1} = \frac{1}{N} \left\| I_{High-1}^{DL} - I_{High} \right\|_2^2, \tag{8}$$

wherein, $$I_{High-1}^{DL}$$

refers to a predicted high-energy image (e.g., a predicted second image), $I_{High}$ refers to a sample high-energy (e.g., a sample second image), and N refers to the total number of training samples.

In some embodiments, the first loss function associated with the sample second image may be used to represent the difference between the predicted second image and the sample second image.

In the embodiment, the processing device may obtain the predicted second image based on the predicted base material density image and the sample second image, and the image processing model may be constrained by ways of constructing a loss function based on the predicted second image and the sample second image. Since the predicted second image is obtained based on the predicted base material density image, the loss function constructed based on the predicted second image and the sample second image may also reflect the accuracy of the predicted base material density image to a certain extent. The purpose of obtaining the base material density image based on the first image with single energy may be achieved based on the trained image processing model. For example, the CT image with single energy may be used to achieve the function of material decomposition.

In some embodiments, the loss function associated with a third image (which may also be referred to as the second loss function associated with the sample second image) may be determined based on at least the sample second image and the sample topology data. For example, the loss function associated with the third image may be constructed based on the sample second image and a sample auxiliary image obtained based on the sample topology data. In some embodiments, the sample auxiliary image may correspond to the sample second image. For example, if the second image is an image with high energy, the sample auxiliary image may be an image with high energy. As another example, if the sample second image is an image with low energy, the sample auxiliary image may be an image with low energy.

For more descriptions about the determination of the sample auxiliary image based on the sample topology data, refer to FIG. 6 and related descriptions thereof, which is not repeated herein.

In some embodiments, the second loss function associated with the sample second image $L_{High-2}$ may be denoted as Equation (9).

$$L_{High-2} = \frac{1}{N} \left\| I_{High-2}^{DL} - I_{High} \right\|_2^2, \tag{9}$$

wherein, $$I_{High-2}^{DL}$$

refers to the sample auxiliary image, $I_{High}$ refers to the sample second image, and N refers to the total number of training samples.

In some embodiments, the second loss function associated with the sample second image may represent the difference between the sample auxiliary image and the sample second image.

In the embodiment, the processing device may obtain the sample auxiliary image based on the predicted base material density image and the sample topology data, and the model may be constrained by the ways of constructing the loss function based on the sample auxiliary image and the sample second image. Since the sample auxiliary image is obtained based on the predicted base material density image and the sample topology data, the loss function constructed based on the sample auxiliary image and the sample second image may also reflect the accuracy of the predicted base material density image to a certain extent.

Merely as an example, the following embodiments may exemplarily illustrate the target loss function obtained through combining partial loss functions. For example, the combination of the loss function associated with the base material density image, the loss function associated with the sample first image, and the first loss function associated with the sample second image may be denoted as Equation (10).

$$L_1 = \lambda \cdot L_{Maerial} + L_{Low} + L_{High-1}, \tag{10}$$

wherein, $L_1$ refers to a combined loss function of the loss function associated with the base material density image, the loss function associated with the sample first image, and the first loss function associated with the sample second image, $\lambda$ refers to a weight balance factor, $\lambda$ may be a constant that is set based on experience, $L_{Maerial}$ refers to the loss function associated with the base material density image, LL ow refers to the loss function associated with the sample first image, and $L_{High-1}$ refers to the first loss function associated with the sample second image.

In some embodiments, the target loss function for the combination of the loss function associated with the base material density image, the loss function associated with the sample first image, the first loss function associated with the sample second image, and the second loss function associated with the sample second image may be shown as Equation (11).

$$L_2 = \lambda \cdot L_{Maerial} + L_{Low} + L_{High-1} + L_{High-2}, \qquad (11)$$

wherein, $L_2$ refers to a combined loss function of the loss function of the base material density image, the loss function associated with the sample first image, and the first loss function associated with the sample second image, and the second loss function associated with the sample second image, A refers to a weight balance factor, $L_{Maerial}$ refers to the loss function associated with the base material density image, LL ow refers to the loss function associated with the sample first image, and $L_{High-1}$ refers to the first loss function associated with the sample second image, and $L_{High-2}$ refers to the second loss function associated with the sample second image. For more detailed descriptions about each part of the loss function, refer to the relevant descriptions above, which are not repeated herein.

In some embodiments, the image processing model may be constrained with a combined loss function exemplified by Equation (11). The target loss function shown in Equation (11) may have more constraints, and the trained model may have stronger robustness, resulting in better prediction results.

The model may be constrained via the loss function shown in the above examples, and the value of the loss function may satisfy a preset condition (e.g., the value of the loss function may converge, or may be smaller than a preset threshold, etc.) or reach a preset count of iterations to obtain the trained image processing model. The trained image processing model may be used to obtain the predicted base material density images of CT images.

In some embodiments of the present disclosure, when the preliminary image processing model is trained based on the training sample data, a target loss function may be constructed based on one or a combination of the label base material density image, the sample first image, the sample second image, and the sample topology data to constrain the model. The trained image processing model may realize the function of material decomposition via a CT image with single energy. In the case of combining and constructing the loss function to constrain the training of the preliminary image processing model, since more constraints are added, the robustness of the trained image processing model may be improved, so that the prediction results of the trained image processing model may be more accurate. When the base material density image is determined based on CT images with dual-energy, the CT images with dual-energy may be obtained via a plurality of scans of the object, and the scanning time of the object may be long and the radiation dose to the object may be high. Compared with the use of the CT images with dual-energy to obtain the base material density image, the scanning time of the object may be shorter and the radiation dose to the object may be lower when the base material density image is obtained via the CT image with single energy (e.g., the first image). In addition, compared to directly obtaining the base material density image through matrix inversion decomposition or iterative material decomposition, the trained image processing model not only may not cause serious degradation of the signal-to-noise ratio of the base material density image, but also reduce the time required to obtain the base material density image.

In some embodiments, the second image corresponding to the first image may be determined by inputting the first image, the base material density image, and the topology data into a trained machine learning model (also referred to as a second trained machine learning model). The second trained machine learning model may be obtained based on a plurality of training samples. Each of the plurality of training samples may include a sample third image with a third energy level or a third energy level, a sample base material density, and sample topology of a sample subject. Each of the plurality of training samples may have a label including a sample fourth image of the sample subject with a fourth energy level or a fourth energy level. The third energy level (or the third energy level) may be different from the fourth energy level (or the fourth energy level). For example, the third energy level may be smaller than the fourth energy level. The third energy level may be smaller than the fourth energy level. In the training of the second trained machine learning model, the sample fourth image of the sample subject may be served as a desired output, and the sample third image, the sample base material density, and the sample topology of the sample subject may be served as input. A predicted fourth image (i.e., a predicted output) may be generated based on the input and compared with the desired output. The parameters of the second trained machine learning model may be optimized based on the comparison result between the desired output and the predicted output in the training.

In some embodiments, when obtaining the low-energy image based on the high-energy image, the processing device may obtain a first image processing model through training in a similar manner to the method illustrated in the operations of FIG. 4. For example, the processing device may obtain a plurality of first training samples. A preliminary first image processing model may be trained based on the plurality of first training samples to determine a trained first image processing model. Each first training sample in the plurality of first training samples may include the sample second image and the label base material density image corresponding to the sample second image. In some embodiments, the sample second image may be a sample high-energy image. Similarly, the processing device may construct a loss function based on the label base material density image, the predicted base material density image, the sample low-energy image, and the sample high-energy image to train the first image processing model. For more details, refer to the specific description of the loss function in the operation 406 of FIG. 4. The difference may be that, when training the first image processing model, the high-energy images in each loss function may be replaced with the low-energy images.

Figure 5:
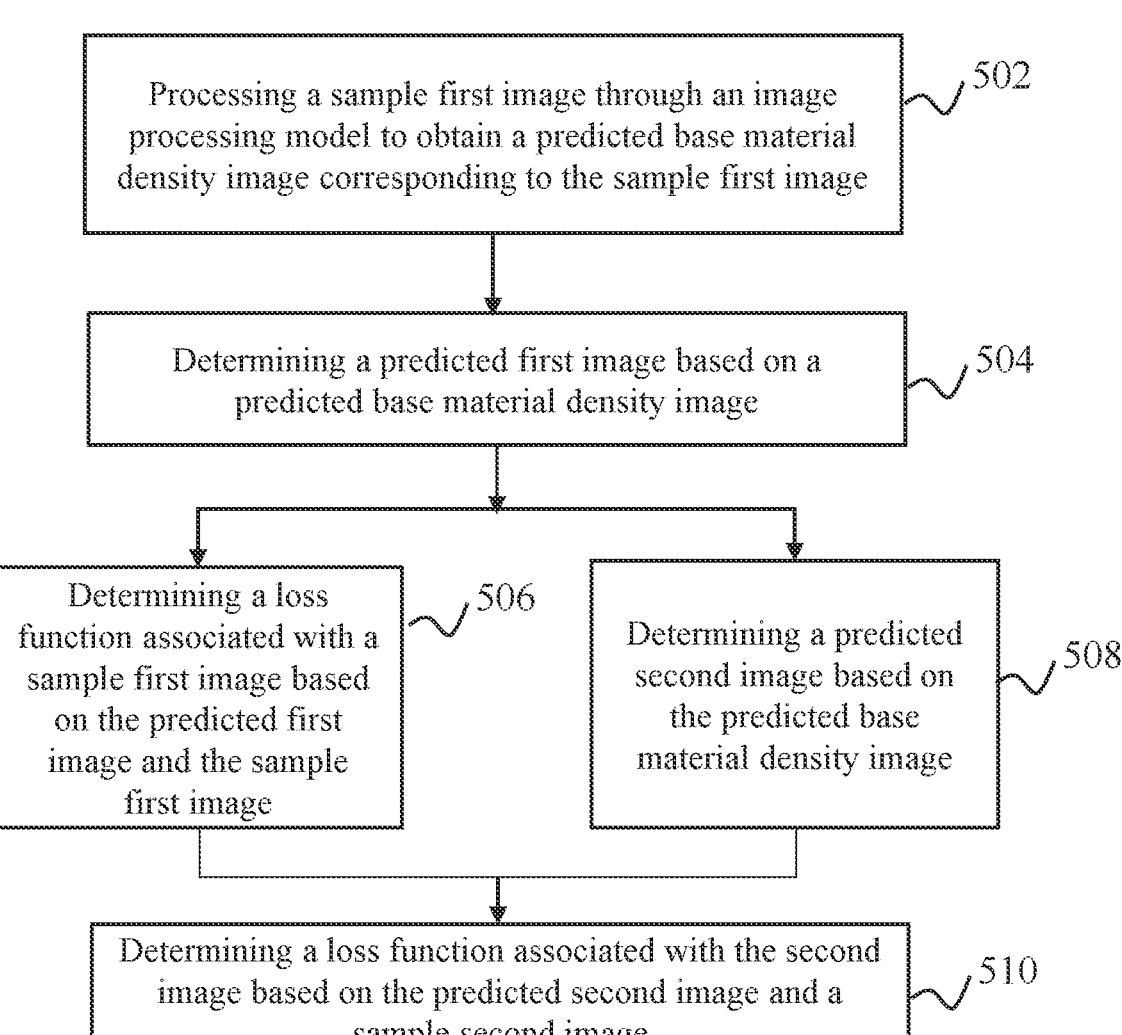
FIG. 5 is an exemplary flow chart illustrating a process for determining a first loss function associated with a sample second image according to some embodiments of the present disclosure.

FIG. 5 is an exemplary flow chart illustrating a process for determining a first loss function associated with a sample second image according to some embodiments of the present disclosure. In some embodiments, a process 500 may be performed by a processing device (e.g., the processing device 140 or the processing device 1000 as described in FIG. 10).

In operation 502, a sample first image may be processed through the image processing model to obtain a predicted base material density image corresponding to the sample first image.

The process of obtaining the predicted base material density image of the sample first image may be the same as the process exemplarily described in FIG. 4. For more details, refer to the relevant descriptions of FIG. 4, which is not repeated herein.

In operation 504, a predicted first image may be determined based on the predicted base material density image.

The predicted first image may refer to an image generated based on the predicted base material density image. In some embodiments, the energy level of the predicted first image may be the same as or similar to the energy level of the sample first image. For example, the energy level of the sample first image may be 80 kVp.

In some embodiments, the processing device may determine the predicted first image based on the following Equation (12).

$$I_{Low}^{DL} = M \cdot A_{low} \tag{12}$$

wherein, $$I_{Low}^{DL}$$

refers to a predicted low-energy image (e.d., a predicted first image), M refers to the predicted base material density image, and $A_{low}$ refers to a material decomposition matrix of the sample first image. The predicted first image $$I_{Low}^{DL}$$

may be obtained through multiplying the predicted base material density image M by the material decomposition matrix $A_{low}$. $A_{low}$ may be obtained through solving the sample first image and the predicted base material density image by ways of the least squares fitting technique.

In operation 506, the loss function associated with the sample first image may be determined based on the predicted first image and the sample first image.

In some embodiments, the loss function associated with the sample first image may be as shown in Equation (7) in the operation 406. The processing device may substitute the predicted first image and the sample first image into Equation (7) to calculate the value of the loss function associated with the sample first image.

In operation 508, the predicted second image may be determined based on the predicted base material density image.

The predicted second image may refer to an image calculated based on the predicted base material density image.

In some embodiments, the processing device may determine the predicted second image based on the following Equation (13).

$$I_{High}^{DL} = M \cdot A_{High} \tag{13}$$

wherein, $$I_{High}^{DL}$$

refers to the predicted second image, M refers to the predicted base material density image, and $A_{High}$ refers to a material decomposition matrix of the sample second image. The predicted second image $$I_{High}^{DL}$$

may be obtained through multiplying the predicted base material density image M by the material decomposition matrix $A_{High}$.

In some embodiments, the material decomposition matrix $A_{High}$ may be obtained through solving the sample second image and the predicted base material density image by the ways of the least squares fitting.

In operation 510, the loss function associated with the second image may be determined based on the predicted second image and the sample second image.

In some embodiments, the loss function associated with the second image may be as shown in the operation 406.

FIG. 6 is an exemplary flow chart illustrating a process for determining a sample auxiliary image according to some embodiments of the present disclosure. In some embodiments, a process 600 may be performed by a processing device (e.g., the processing device 140 or the processing device 1000 as described in FIG. 10). When the programs or instructions are executed, the process 600 may be implemented.

In operation 602, sample material density data may be determined based on a predicted base material density image. In some embodiments, the sample material density data may be determined by performing forward projection on the predicted base material density image. Detailed description may refer to the operation 302, which is not repeated herein.

In operation 604, a difference in the sample topology data may be determined based on sample first topology data and sample second topology data. The difference in the sample topology data may be a difference between the sample first topology data and the sample second topology data.

In operation 606, the sample image decomposition matrix difference may be determined based on the sample material density data and the difference in the sample topology data. The image decomposition matrix difference may be a difference between an image decomposition matrix of the sample first image and an image decomposition matrix of the sample second image. The determination of the image decomposition matrix difference may refer to Equation (2) to Equation (4) in the operation 302, which is not repeated herein.

In operation 608, a sample image difference may be determined based on the sample image decomposition matrix difference and the predicted base material density image. The image difference may include a difference between the sample first image and the sample second image. The determination of the image difference may refer to the related descriptions of the operation 304, which is not repeated herein.

In operation 610, the sample auxiliary image may be determined based on the sample first image and the sample image difference. The determination of the sample auxiliary image may refer to the related descriptions of the operation 306, which is not repeated herein.

The determination of the sample auxiliary image may be the same as or similar to the second image. The determination of the sample auxiliary image may be performed according to process 300 as described in FIG. 3. The difference between the acquisition of the sample auxiliary image and the acquisition of the second image may be that the data used may be different, but the determination process may refer to each other. For example, the second image may be determined based on the sample first image, the predicted base material density image, and the topology data as described in FIG. 3. The sample auxiliary image may be determined based on the sample first image, the predicted base material density image, and the sample topology data. Therefore, regarding the process of determining the sample auxiliary image exemplified in FIG. 6, refer to the related descriptions of FIG. 3, or FIG. 9 for relevant details, which are not repeated herein.

Figure 7:
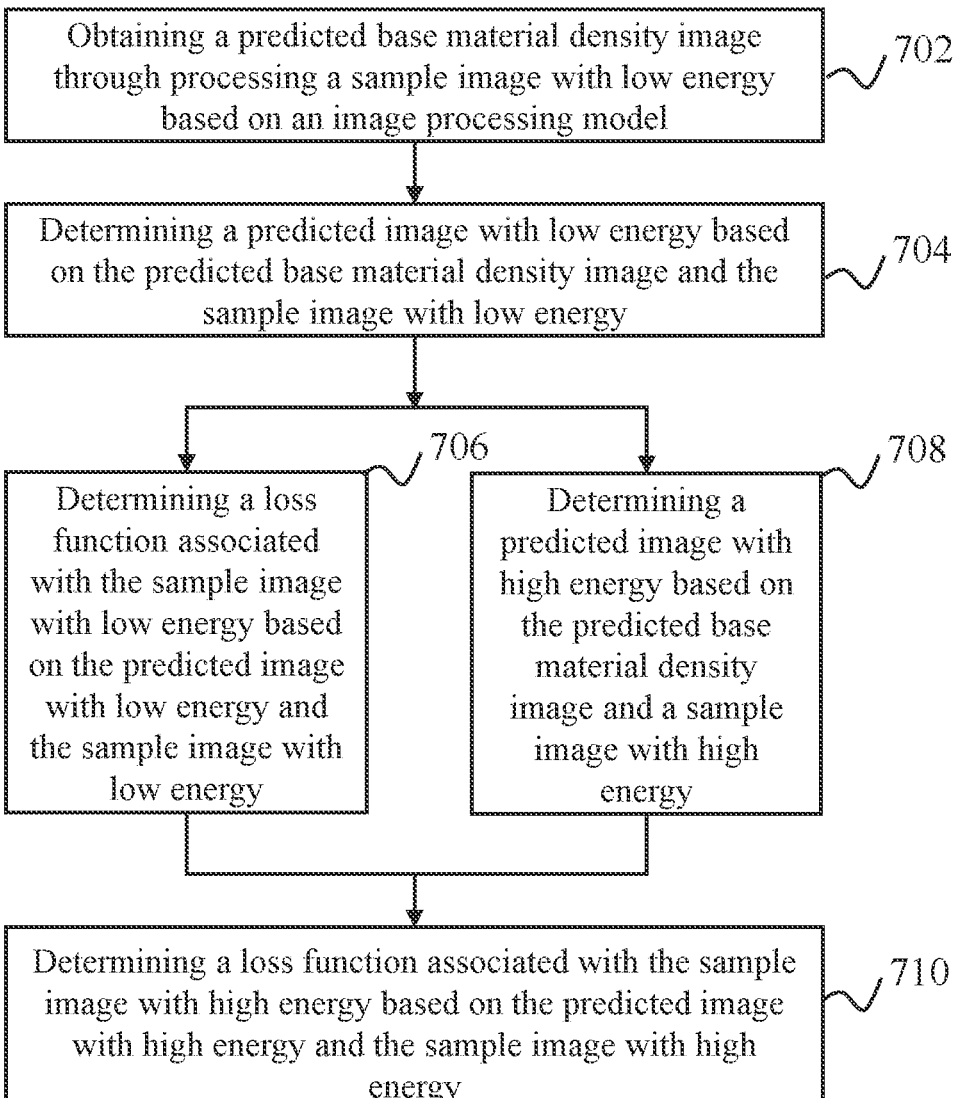
FIG. 7 is an exemplary flow chart illustrating a process for determining a loss function associated with a first image and a loss function associated with a sample second image according to some embodiments of the present disclosure.

FIG. 7 is an exemplary flow chart illustrating a process for determining a loss function associated with a sample first image and a loss function associated with a second image according to some embodiments of the present disclosure. In some embodiments, a process 700 may be performed by a processing device (e.g., the processing device 140 or the processing device 1000 as described in FIG. 10).

In operation 702, the predicted base material density image may be obtained through processing the sample image with low energy based on the image processing model.

The process of obtaining the predicted base material density image may be the same as the process exemplarily described in FIG. 5. For more details, refer to the related descriptions of FIG. 5, which is not repeated herein.

In operation 704, a predicted image with low energy may be determined based on the predicted base material density image and the sample image with low energy.

The predicted image with low energy (e.g., the predicted first image) may refer to an image with low energy determined based on the predicted base material density image. For more descriptions about determining the predicted image with low energy, refer to the operation 504, and the details are not repeated herein.

In operation 706, a loss function associated with the sample image with low energy may be determined based on the predicted image with low energy and the sample image with low energy (e.g., the sample first image).

In operation 708, a predicted image with high energy (e.g., a predicted second image) may be determined based on the predicted base material density image and a sample image with high energy.

In operation 710, a loss function associated with the sample image with high energy (e.g., the first loss function associated with the sample second image) may be determined based on the predicted image with high energy and the sample image with high energy (e.g., the sample second image).

For a detailed description of each operation in the process 900, refer to FIG. 6 and the related descriptions, which are not repeated herein.

Figure 8:
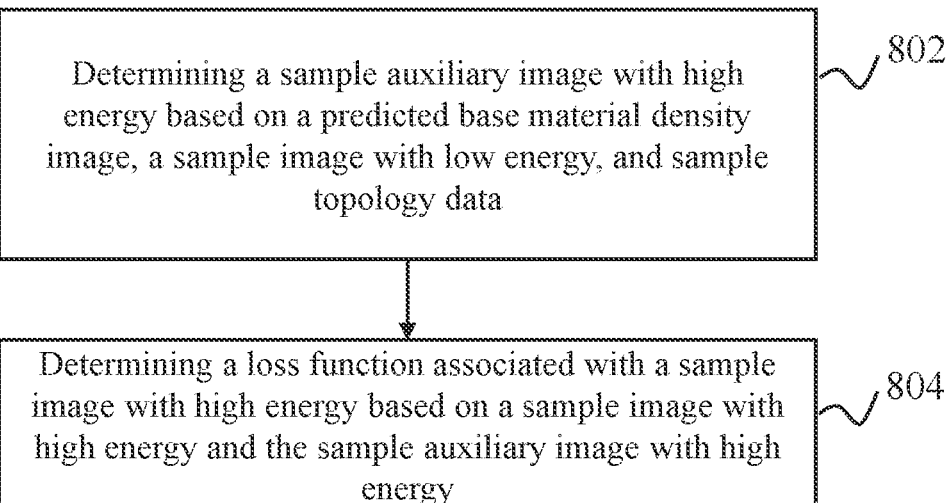
FIG. 8 is an exemplary flow chart illustrating a process for determining a loss function associated with a sample auxiliary image according to some embodiments of the present disclosure.

FIG. 8 is an exemplary flow chart illustrating a process for determining a first loss function associated with a sample auxiliary image according to some embodiments of the present disclosure. In some embodiments, a process 800 may be performed by a processing device (e.g., the processing device 140 or the processing device 1000 as described in FIG. 10). When the programs or instructions are executed, the process 1000 may be implemented.

In operation 802, a sample auxiliary image with high energy (e.g., the sample auxiliary image) may be determined based on the predicted base material density image, the sample image with low energy (e.g., the sample first image), and the sample topology data.

A sample auxiliary image may refer to an image obtained based on the sample low-energy image, the predicted base material density image, and the sample topology data, and the image may be used to construct the loss function to constrain the image processing model during the model training process. In some embodiments, the energy level corresponding to the sample auxiliary image may be the same as the energy level corresponding to the sample second image.

In operation 804, a loss function associated with a sample image with high energy (e.g., a second loss function associated with the sample second image) may be determined based on the sample image with high energy (e.g., the sample second image) and the sample auxiliary image with high energy.

FIG. 9 is an exemplary flow chart illustrating a process for determining a sample auxiliary image according to some embodiments of the present disclosure. In some embodiments, a process 900 may be performed by a processing device (e.g., the processing device 140 or the processing device 1000 as described in FIG. 10).

In operation 902, sample material density data may be determined based on the label base material density image.

The material density data may be the data obtained through performing the forward projection on the base material density image. The material density data may be used to determine the decomposition matrix difference between the image with high energy and the image with low energy.

In some embodiments, the processing device may perform the forward projection on the label base material density image to obtain the sample material density data.

In operation 904, the difference in the sample topology data may be determined based on the sample topology data with low energy and the sample topology data with high energy.

In some embodiments, the processing device may subtract the sample topology data with low energy from the sample topology data with high energy to obtain the difference in the sample topology data.

In operation 906, the material decomposition matrix difference may be determined based on the difference in the sample material density data and the sample topology data.

In some embodiments, the CT image with dual-energy may be represented through the following Equations (14) and (15), respectively.

$$I_{Low} = M \cdot A_{Low}, \tag{14}$$

$$I_{High} = M \cdot A_{High}, \tag{15}$$

wherein, $I_{Low}$ refers to a low-energy image (e.g., the sample first image), $I_{High}$ refers to a high-energy image (e.g., the sample second image), $A_{Low}$ refers to a material decomposition matrix of the low-energy image (e.g., the sample first image), $A_{High}$ refers to a material decomposition matrix of the high-energy image (e.g., the sample second image), and M refers to the base material density image (e.g., the label base material density image).

Equation (16) as follows may be obtained by subtracting Equation (14) from Equation (15).

$$I_{diff} = M \cdot A_{diff} \tag{16}$$

wherein, $I_{diff}$ refers to an image difference between the sample second image and the sample first image (also referred to as an image difference between the low-energy image and the high-energy image), and $A_{diff}$ refers to the image decomposition matrix difference between the material decomposition matrix of the sample second image and the material decomposition matrix of the sample first image.

The forward projection may be performed simultaneously on two sides of Equation (16), and the symbol of the forward projection may be marked as R. Equation (17) may be obtained after the forward projection:

$$R \cdot I_{diff} = R \cdot M \cdot A_{diff} \tag{17}$$

wherein, $R \cdot I_{diff}$ refers to a difference in energy data of the sample second image and the sample first image, $R \cdot M$ refers to the material density data of the base material density image, and $A_{diff}$ refers to the material decomposition matrix difference between the material decomposition matrix of the sample second image and the material decomposition matrix of the sample first image. In some embodiments, $A_{diff}$ may be obtained based on Equation (17) through using the least squares fitting technique.

Based on the principles described above, in some embodiments, the processing device may obtain the material decomposition matrix difference based on Equation (17). Specifically, $R \cdot I_{diff}$ refers to the difference in the topology data, which represents the energy difference between the second topology data and the first topology data or the energy difference between the sample first image and the sample second image. The material density data may be obtained through performing the forward projection on the predicted base material density image, that is, $R \cdot M$. The material decomposition matrix difference may be obtained through performing the least square fitting technique according to Equation (17).

In operation 908, an image difference may be determined based on the material decomposition matrix difference and the label base material density image.

The image difference may be a difference between the sample second image and the sample first image. In some embodiments, after the material decomposition matrix difference is obtained based on the difference in the sample topology data and the label base material density image, the image difference may be obtained through Equation (16) exemplified above. In Equation (16), M refers to the label base material density image, and $A_{diff}$ refers to the material decomposition matrix difference. The base material density image M and material decomposition matrix difference $A_{diff}$ may be substituted into Equation (16) to obtain the image difference $I_{diff}$.

In operation 910, a sample auxiliary image (e.g., a sample auxiliary image with high energy) may be determined based on the sample first image and the image difference.

In some embodiments, the processing device may determine the sample auxiliary image based on a sample first image (e.g., a sample image with low energy) and the image difference, and Equation (14) to Equation (16). Since $I_{diff}=I_{High}-I_{Low}$ has been obtained, $M \cdot A_{diff}$ has also been obtained, and $I_{Low}$ refers to the low-energy image (e.g., the sample first image), the sample auxiliary image may be obtained through adding the image difference to the sample first image.

It should be noted that the processes described above are merely provided for illustration purposes, and not intended to limit the scope of the present disclosure. For persons having ordinary skills in the art, a certain amount of variations, changes, and/or modifications may be deducted under the guidance of the present disclosure. Those variations, changes, and/or modifications do not depart from the scope of the present disclosure, for example, changes to the operations of the processes in the present disclosure, such as adding preprocessing operations and storage operations, or the like.

FIG. 10 is an exemplary block diagram illustrating a system for imaging according to some embodiments of the present disclosure. As shown in FIG. 10, the system may include an obtaining module 1002, a first determination module 1004, a second determination module 1006, a third determination module 1008, and a storage module 1010.

The obtaining module 1002 may be configured to obtain information and/or data for an imaging procedure. For example, the obtaining module 1002 may obtain image data collected by one or more visual sensors via monitoring an imaging procedure. As another example, the obtaining module 1002 may obtain a trained image processing model for imaging. The trained image processing model for imaging of an image may be configured to determine the base material density image corresponding to the first image through processing the first image. In some embodiments, the obtaining module 1002 may obtain the image data or the trained image processing model from the imaging device 110, the storage device 150, the terminal(s) 130, or any other storage device from time to time, e.g., periodically or in real-time. For example, the image data may be collected by the imaging device 110 and transmitted to the one or more components of the system 100 for imaging of an image.

In some embodiments, the obtaining module 1002 may be used to obtain the first image and the topology data of the object.

The object may refer to an object that requires image processing. The object may include patients, or other medical experimental objects (e.g., experimental mice or other animals), or the like. The object may also be part of a patient or other medical subject, including organs and/or tissues, for example, heart, lungs, ribs, abdominal cavity, or the like.

In some embodiments, the topology data may include the first topology data and the second topology data. The first topology data may correspond to the second topology data. The first image and the first topology data may be obtained for the object under a first energy level scan, and the second topology data may be obtained for the object under a second energy level scan.

In some embodiments, the obtaining module 1002 may obtain the first image and the topology data of the object through reading from the imaging device, the database, the storage device, or through calling a related data interface.

The first determination module 1004 may be used to determine the base material density image corresponding to the first image.

In some embodiments, the first determination module 1004 may process the first image by using a preset image processing model to determine the base material density image corresponding to the first image.

The first determination module 1004 may determine a detection result for the imaging procedure using the trained imaging processing model based on the image data. The first determination module 1004 may input the image data into the trained imaging processing model. The first determination module 1004 may obtain the detection result generated using the trained imaging processing model based on the inputted image data.

In some embodiments, the first determination module 1004 may input the first image into the preset image processing model, and output the base material density image from the image processing model. In some embodiments, the image processing model may include a deep learning-based U-net model, a deep learning-based V-net model, or the like.

The second determination module 1006 may be configured to determine the difference in the topology data based on the first topology data and the second topology data.

The difference in the topology data may refer to the difference between the energy topology data at two different energy levels. In some embodiments, the second determination module 1006 may subtract the first topology data from the second topology data to obtain the difference in the topology data.

The third determination module 1008 may be configured to determine the second image corresponding to the first image based on the first image, the base material density image, and the difference in the topology data.

In some embodiments, the third determination module 1008 may determine the image decomposition matrix difference based on the base material density image and the difference in the topology data. The third determination module 1008 may also determine the image difference based on the base material density image and the image decomposition matrix difference. The third determination module 1008 may also determine the second image based on the first image and the image difference.

In some embodiments, the third determination module 1008 may determine the material density data based on the base material density image. The third determination module 1008 may also determine the image decomposition matrix difference based on the material density data and the difference in the topology data.

Figure 11:
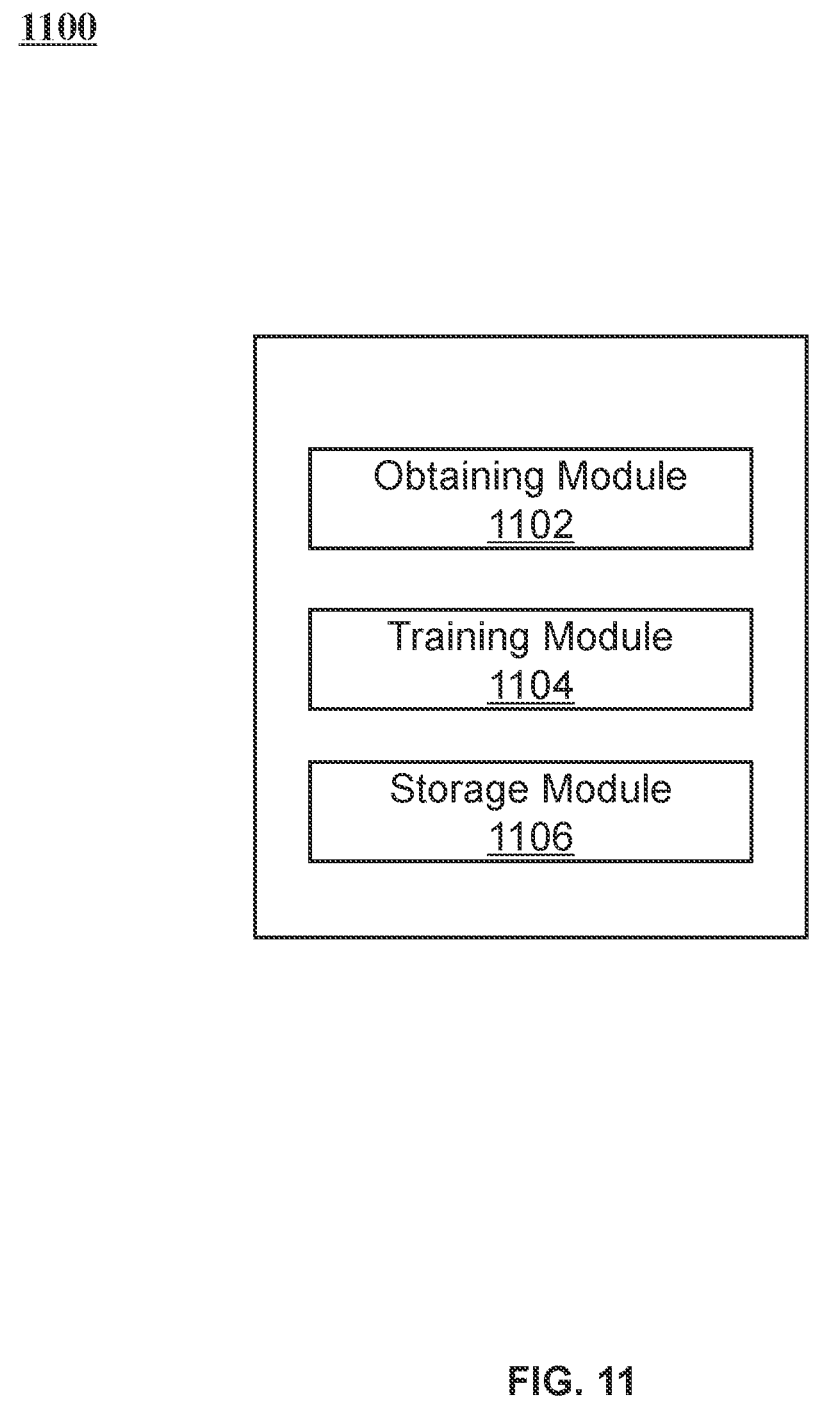

FIG. 11 is an exemplary block diagram illustrating a processing device for training according to some embodiments of the present disclosure. As shown in FIG. 11, the processing device 1100 may include an obtaining module 1102, a training module 1104, and a storage module 1106. The processing device 1100 may be the same as or different from the processing device of the system 100.

The training module 1104 may be used to train the obtained image processing model.

The training module 1104 may be configured to train a preliminary imaging processing model to obtain the trained imaging processing model. In some embodiments, the trained imaging processing model may be obtained by training the preliminary imaging processing model based on the plurality of training samples using a training algorithm.

Exemplary training algorithms may include a gradient descent algorithm, a Newton's algorithm, a Quasi-Newton algorithm, a Levenberg-Marquardt algorithm, a conjugate gradient algorithm, or the like, or a combination thereof.

The training module 1104 may be used to obtain the plurality of training samples. Each training sample in the plurality of training samples may include the sample first image.

The training module 1104 may be used to input the plurality of training samples into the image processing model, and determine the predicted base material density image corresponding to the sample first image.

Based on one or more of the label base material density image, the sample first image, the sample second image, the sample topology data, and the predicted base material density image, the training module 1104 may obtain the trained image processing model by adjusting the parameters of the image processing model to optimize the target loss function.

It should be noted that the training module 1104 may be optional in the imaging system 1100 for processing an image. In some embodiments, the system 1100 for processing an image may also not include the training module 1104.

The storage module 1106 may store information. The information may include programs, software, algorithms, data, text, numbers, images, and some other information. For example, the information may include image data associated with an imaging procedure, a trained imaging processing model for imaging of an image, or the like.

It should be noted that the system and modules of the image processing model described above are merely provided for illustration purposes, and not intended to limit the scope of the present disclosure. It should be understood that, for persons having ordinary skills in the art, after understanding the principle of the system, any combination of the modules may occur, or a subsystem may be formed to connect with other modules without departing from the principle. For example, in some embodiments, the first determination module 1004 and the second determination module 1006 may be different modules in the system, or may be one module to implement the functions of the two or more modules mentioned above. For example, each module may share one storage module, and each module may also have its own storage module. Those variations, changes, and/or modifications do not depart from the scope of the present disclosure.

The beneficial effects that the embodiments of the present disclosure brings may include but not be limited to: (1) combined with deep learning technology, the corresponding second image may be obtained based on the first image with single energy through using the trained image processing model; (2) the hardware implementation of the embodiments of the present disclosure may be simple and convenient. Since the second topology data may be obtained based on the first image and the first topology data that are obtained through scanning the object with low energy level rays, and the object may be scanned with relatively high energy level rays at an angle, thereby reducing the radiation dose reaching to the object; (3) more information may be obtained in the calculation process through introducing the topology data, so that the value of the DE CT may be improved, and the accuracy of the post-processing results of the DE image may be improved; (4) before inputting the first image into the image processing model, processing such as denoising on the first image may not be performed, which simplifies the process of obtaining the base material density image; (5) the output result of the image processing model may be the base material density image. Compared with obtaining an estimated second image based on the first image through using a deep learning model, and obtaining the base material density image based on the first image and the estimated second image, the serious degradation of the image signal-to-noise ratio caused through performing matrix inversion on the first image and the second image may be avoided and reduced, and the time required for iterative material decomposition may be saved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

What is claimed is:

1. A method for imaging, comprising:
obtaining a first image and topology data of an object, the first image being obtained by scanning the object under a first energy level;
determining a base material density image corresponding to the object; and
determining, based on the first image, the base material density image, and the topology data, a second image corresponding to the first image, the second image corresponding to a second energy level, and the second energy level being different from the first energy level.

2. The method of claim 1, wherein the second energy level exceeds the first energy level.

3. The method of claim 1, wherein the first energy level exceeds the second energy level.

4. The method of claim 1, wherein the topology data includes a difference between first topology data and second topology data of the object respectively corresponding to the first energy level and the second energy level, and the determining, based on the first image, the base material density image, and the topology data, a second image corresponding to the first image includes:
determining, based on the base material density image and the difference between first topology data and second topology data of the object, an image decomposition matrix difference;
determining, based on the base material density image and the image decomposition matrix difference, an image difference; and
determining, based on the first image and the image difference, the second image.

5. The method of claim 4, wherein the determining, based on the base material density image and the difference in the topology data, an image decomposition matrix difference includes:
determining, based on the base material density image, material density data; and
determining, based on the material density data and the difference between first topology data and second topology data of the object, the image decomposition matrix difference.

6. The method of claim 4, wherein the first topology data is obtained from scan data corresponding to the first image, or obtained by an imaging device via scanning the object under the first energy level.

7. The method of claim 1, wherein the determining a base material density image corresponding to the object includes:

determining, by processing the first image based on a matrix inverse decomposition or an iterative material decomposition, the base material density image.

8. The method of claim 1, wherein the determining a base material density image includes:
determining, by processing the first image based on a trained image processing model, the base material density image.

9. The method of claim 8, wherein the trained image processing model is obtained by operations, including:
obtaining a plurality of training samples; and
determining, by training a preliminary image processing model based on the plurality of training samples, the trained image processing model, wherein each training sample in the plurality of training samples includes a sample first image of a sample subject, a sample second image of the sample subject, sample topology data of the sample subject, and a label base material density image corresponding to the sample first image.

10. The method of claim 9, wherein the determining, by training a preliminary image processing model based on the plurality of training samples, the trained image processing model includes:
for each training sample, determining, based on the preliminary image processing model, a predicted base material density image corresponding to the sample subject; and
adjusting, based on the predicted base material density image, a parameter of the primary image processing model to optimize a value of a target loss function, and obtaining the trained image processing model, wherein the target loss function is determined based on at least one of the label base material density image, the sample first image, the sample second image, or the sample topology data.

11. The method of claim 10, wherein the target loss function includes at least one of a first function, a second function, a third function, or a fourth function, wherein
the first function is determined based on the label base material density image;
the second function is determined based on the sample first image;
the third function is determined based on the sample second image; and
the fourth function is determined based on the sample second image and the sample topology data.

12. The method of claim 11, wherein the sample topology data includes sample first topology data and sample second topology data, and the fourth function is determined according to operations including:
determining, based on the predicted base material density image, the sample first image, and the sample topology data, a sample auxiliary image; and
determining, based on the sample auxiliary image, the fourth function.

13. The method of claim 12, wherein the determining, based on the predicted base material density image, the sample first image, and the sample topology data, a sample auxiliary image includes:
determining, based on the predicted base material density image, sample material density data;
determining, based on the sample first topology data and the sample second topology data, a difference in the sample topology data;
determining, based on the sample material density data and the difference in the sample topology data, a sample image decomposition matrix difference;

determining, based on the sample image decomposition matrix difference and the predicted base material density image, a sample image difference; and determining, based on the sample first image and the sample image difference, the sample auxiliary image.

14. A system for imaging, comprising:

at least one storage device including a set of instructions; and at least one processor in communication with the at least one storage device, wherein when executing the set of instructions, the at least one processor is configured to cause the system to:

obtain a first image and topology data of an object, the first image being obtained by scanning the object under a first energy level;

determine a base material density image corresponding to the object; and determine, based on the first image, the base material density image, and the topology data, a second image corresponding to the first image, the second image corresponding to a second energy level, and the second energy level being different from the first energy level.

15. The system of claim 14, wherein the base material density image is determined by processing the first image based on a trained image processing model, and the trained image processing model is obtained by operations, including:

obtaining a plurality of training samples; and determining, by training a preliminary image processing model based on the plurality of training samples, the trained image processing model, wherein each training sample in the plurality of training samples includes a sample first image of a sample subject, a sample second image of the sample subject, sample topology data of the sample subject, and a label base material density image corresponding to the sample first image.

16. The system of claim 15, wherein to determine, by training a preliminary image processing model based on the plurality of training samples, the trained image processing model, the at least one processor is further configured to cause the system to:

for each training sample, determine, based on the preliminary image processing model, a predicted base material density image corresponding to the sample subject; and adjust, based on the predicted base material density image, a parameter of the primary image processing model to optimize a value of a target loss function, and obtain the trained image processing model, wherein the target loss function is determined based on at least one of the label base material density image, the sample first image, the sample second image, or the sample topology data.

17. The system of claim 16, wherein the target loss function includes at least one of a first function, a second function, a third function, or a fourth function, wherein the first function is determined based on the label base material density image;

the second function is determined based on the sample first image;

the third function is determined based on the sample second image; and the fourth function is determined based on the sample second image and the sample topology data.

18. The system of claim 17, wherein the sample topology data includes sample first topology data and sample second topology data, and the fourth function is determined according to operations including:

determining, based on the predicted base material density image, the sample first image, and the sample topology data, a sample auxiliary image; and determining, based on the sample auxiliary image, the fourth function.

19. The system of claim 18, wherein to determine, based on the predicted base material density image, the sample first image, and the sample topology data, a sample auxiliary image, the at least one processor is further configured to cause the system to:

determine, based on the predicted base material density image, sample material density data;

determine, based on the sample first topology data and the sample second topology data, a difference in the sample topology data;

determine, based on the sample material density data and the difference in the sample topology data, a sample image decomposition matrix difference;

determine, based on the sample image decomposition matrix difference and the predicted base material density image, a sample image difference; and determine, based on the sample first image and the sample image difference, the sample auxiliary image.

20. A non-transitory computer readable medium, comprising at least one set of instructions for imaging, wherein when executed by one or more processors of a computing device, the at least one set of instructions causes the computing device to perform a method, the method comprising:

obtaining a first image and topology data of an object, the first image being obtained by scanning the object under a first energy level;

determining a base material density image corresponding to the object; and determining, based on the first image, the base material density image, and the topology data, a second image corresponding to the first image, the second image corresponding to a second energy level, and the second energy level being different from the first energy level.

* * * * *